United States Patent
Yamakawa et al.

(10) Patent No.: US 8,491,209 B2
(45) Date of Patent: Jul. 23, 2013

(54) KEYBOARD APPARATUS, ELECTRONIC APPARATUS, AND METHOD OF PRODUCING THE KEYBOARD APPARATUS

(75) Inventors: Hisao Yamakawa, Nagano (JP); Yohei Ishii, Nagano (JP); Masayoshi Koganei, Tokyo (JP); Akihito Shinohara, Kanagawa (JP); Yutaka Ogasawara, Saitama (JP)

(73) Assignee: Sony Corporation, Tokyo (JP)

( * ) Notice: Subject to any disclaimer, the term of this patent is extended or adjusted under 35 U.S.C. 154(b) by 1058 days.

(21) Appl. No.: 12/232,620

(22) Filed: Sep. 19, 2008

(65) Prior Publication Data

US 2009/0079593 A1   Mar. 26, 2009

(30) Foreign Application Priority Data

Sep. 21, 2007 (JP) ................. 2007-246284
Sep. 21, 2007 (JP) ................. 2007-246289

(51) Int. Cl.
*B41J 5/00* (2006.01)
(52) U.S. Cl.
USPC ......................................... 400/472
(58) Field of Classification Search
USPC .......................... 400/472; 235/472
See application file for complete search history.

(56) References Cited

U.S. PATENT DOCUMENTS

| | | | | |
|---|---|---|---|---|
| 4,447,687 A * | 5/1984 | Marquardt et al. | ........... | 200/533 |
| 5,575,576 A * | 11/1996 | Roysden, Jr. | ............... | 400/472 |
| 5,938,352 A * | 8/1999 | Chen | .......................... | 400/472 |
| 6,011,227 A | 1/2000 | Yoneyama | | |
| 6,216,988 B1 * | 4/2001 | Hsu et al. | ..................... | 248/118 |
| 2006/0165465 A1* | 7/2006 | Wu | ............................... | 400/491 |

FOREIGN PATENT DOCUMENTS

| | | |
|---|---|---|
| JP | 2-5831 U | 1/1990 |
| JP | 8-212868 A | 8/1996 |
| JP | 11-224559 A | 8/1999 |

* cited by examiner

*Primary Examiner* — Daniel Hess
*Assistant Examiner* — David Tardif
(74) *Attorney, Agent, or Firm* — Foley & Lardner LLP

(57) ABSTRACT

A keyboard apparatus includes: a plurality of keys; a switching section that detects depression of each of the keys; a top cover that is integrally formed with a partitioning portion separating adjacent keys from each other; a frame member that includes a plurality of key receiving portions which, in a case where the frame member is attached to the top cover, support the keys in a manner that the keys are placed in spaces surrounded by the partitioning portion; a first coupling section that couples the top cover with the frame member; and a second coupling section that couples a first surface portion of the keyboard apparatus including the switching section, with a second surface portion of the keyboard apparatus including the top cover and the frame member with which the top cover is coupled by the first coupling section.

9 Claims, 17 Drawing Sheets

KEYBOARD APPARATUS, ELECTRONIC APPARATUS, AND METHOD OF PRODUCING THE KEYBOARD APPARATUS

CROSS-REFERENCE TO RELATED APPLICATIONS

This application is based on and claims priority under 35 U.S.C. 119 from Japanese Patent Application No. 2007-246284 filed Sep. 21, 2007 and Japanese Patent Application No. 2007-246289 filed Sep. 21, 2007.

BACKGROUND OF THE INVENTION

1. Field of the Invention

The present invention relates to a keyboard apparatus for enabling a user to input information to an information processing apparatus such as a computer, and more particularly to a keyboard apparatus which is a large keyboard apparatus to be used together with a desktop personal computer or the like, and in which foreign matters such as dust or liquid droplets hardly enter a gap between keys, the reliability is high, and the appearance is excellent.

The present invention also relates to an electronic apparatus having a key input apparatus to which the keyboard apparatus is applied, and a method of producing the keyboard apparatus.

2. Related Art

FIG. 11 shows an appearance of a typical example of a conventional keyboard apparatus 10, and FIG. 12 is an exploded perspective view showing the structure of the keyboard apparatus 10. As shown in FIG. 11, a top cover 160 has a structure in which a portion where keys are arranged is largely cut away, and key caps (key tops) 201 of keys (not shown) attached to a frame member which will be described later are exposed to the outside through the portion, thereby enabling a user to operate the keys. It is often that nothing is disposed in a portion 151 between adjacent keys. In order to prevent foreign matters such as dust or liquid droplets from entering the portion 151, however, it is contemplated that a member 151a which closes the portion is inserted into the portion.

Hereinafter, the structure of the conventional keyboard apparatus 10 will be described with reference to FIG. 12 which is an exploded perspective view. FIG. 12 is drawn upside down with respect to the use state of the keyboard apparatus 10, and the top cover 160 is positioned in the lower side. In a frame member 700, key receiving portions to which the keys are to be attached are formed at positions corresponding to the key layout. In FIG. 12, a part of the key receiving portions is shown in a simplified manner as a lattice-like pattern. Key movable mechanism portions 250 of the keys which will be described later are attached to the key receiving portions. A sheet switch 300 having electrical contacts serving as membrane switches which perform on/off operations in accordance with the existence/nonexistence of depression is placed on the frame member 700. A back plate 400 such as a metal-made plate serving as a reinforcing member is placed on the sheet switch 300.

In the frame member 700, a plurality of pins (in FIG. 12, reference numerals 701 to 704) are formed in the vicinities of the four corners so as to project to the lower side (in the figure, the upper side) of the keyboard apparatus, respectively. In the sheet switch 300, holes 301 to 304 which are slightly larger than each pin so as to allow the pins to pass therethrough are formed, and, in the back plate 400, holes 401 to 404 are similarly formed correspondingly with the positions of the pins. In an assembling process, the pins are passed through the holes, tip end portions of the pins made of a resin are heated so as to be melted, and then collapsed to be welded to the back plate 400, whereby the frame member 700 and the back plate 400 are coupled together in a form that the sheet switch 300 is interposed therebetween. Then, the top cover 160 is coupled with the coupled member in which the frame member 700, the sheet switch 300, and the back plate 400 are coupled together. Finally, a bottom cover 500 is coupled to complete the assembly of the keyboard apparatus 10. In addition to the vicinities of the four corners of the frame member 700, the pins may be further disposed in a plurality of other places.

Hereinafter, an example of the key movable mechanism portions 250 will be described. As a typical structure of a movable mechanism for enabling a vertical movement of a key, there is a so-called pantograph structure. FIG. 13 schematically shows the pantograph structure. Although not illustrated in the figure, a holder is attached to the upper side of the pantograph structure, and the top cover 160 is attached to the upper side of the holder. Specifically, the structure is configured in a finer manner. However, the description of the structure is omitted. Recently, the holder is not sometimes attached. When a user depresses the key cap 201 of the key as an operation for a key input, the pantograph structure of the key movable mechanism portion 250 is deformed to press a rubber spring which is not shown. Then, a switch which is in the sheet switch 300 and at the position corresponding to the key receives a pressure from the rubber spring, to enter a contact state, whereby a key input is performed. A key structure using such a pantograph structure is disclosed in many publications. An example of such publications is JP-A-11-224559 (the term "JP-A" as used herein means an "unexamined published Japanese patent application").

JP-A-8-212868 discloses an example in which a frame member is molded integrally with a top cover. JP-UM-A-2-5831 discloses a configuration in which the frame member is split into a plurality of pieces, as a countermeasure against curvature of a keyboard apparatus due to shrinkage of a frame member after resin molding. (the term "JP-UM-A" as used herein means an "unexamined published Japanese utility model application").

In a conventional keyboard apparatus in which a partitioning portion is not disposed between keys, dust or liquid droplets such as spilled coffee easily enter a gap between keys. The dust entering the inside causes the sensation of depressing a key to be dispersed, and conducting the operation can be difficult. When the liquid droplets enter a switch portion, there is a possibility that the switch portion does not normally operate.

In the case where a keyboard apparatus is produced by a conventional configuration and assembling method, particularly, in the case where a frame member of a large keyboard apparatus is configured by plastic molding, shrinkage after resin molding causes a positioning error in the longitudinal direction of the frame member. When a partitioning portion is to be disposed between keys, the gap between the partitioning portion and a key cap must be set with an extra margin because of the positioning error. Although the partitioning portion is disposed, therefore, a small gap is formed between the key cap and the partitioning portion, thereby causing a problem in that the effect of preventing foreign matters such as dust or liquid droplets from entering is incompletely achieved.

After the shrinkage of a molded product settles, moreover, a situation may possibly occur where the size of the gap between the key cap and the partitioning portion is varied depending on the position in the keyboard apparatus. From the viewpoint of appearance, the situation is not preferable.

In the case where the partitioning portion is disposed as a member separate from the top cover, a gap may be formed also between the top cover and the partitioning portion. From the viewpoint of product design, a clear impression cannot be made when the keyboard apparatus is seen from the upper side. Consequently, there is a problem in that the design does not sometimes suite the taste of the user.

In a keyboard apparatus of JP-A-8-212868, a top cover and a frame member are molded integrally with each other, and hence the relative positional misfit between the top cover and the frame member does not occur. Because of the structure in which a partitioning portion is not formed between keys, however, the structure cannot prevent foreign matters such as dust or liquid droplets from entering.

In a keyboard apparatus of JP-UM-A-2-5831, a configuration is disclosed where, as a countermeasure against deformation due to shrinkage of a frame member after resin molding, the frame member is split into a plurality of pieces. However, the countermeasure is conducted in order to prevent curvature of the keyboard apparatus from occurring. A top cover structure in which a partitioning portion is disposed between keys is not disclosed. The countermeasure is not conducted for accurate alignment of key attachment positions with respect to key arrangement spaces surrounded by a partitioning portion.

SUMMARY OF THE INVENTION

It is an object of the present invention to provide a keyboard apparatus which can solve the above-discussed problems of a conventional keyboard apparatus, which can prevent foreign matters such as dust or liquid droplets from entering as far as possible, which has high reliability, and which is excellent in appearance.

It is an another object of the present invention to provide an electronic apparatus having a key input apparatus to which the keyboard apparatus is applied, and a method of producing the keyboard apparatus.

In order to achieve the object described above:

(1) According to a first aspect of the present invention, a keyboard apparatus includes: a plurality of keys; a switching section that detects depression of each of the keys; a top cover that is integrally formed with a partitioning portion separating adjacent keys from each other; a frame member that includes a plurality of key receiving portions which, in a case where the frame member is attached to the top cover, support the keys in a manner that the keys are placed in spaces surrounded by the partitioning portion; a first coupling section that couples the top cover with the frame member; and a second coupling section that couples a first surface portion of the keyboard apparatus including the switching section, with a second surface portion of the keyboard apparatus including the top cover and the frame member with which the top cover is coupled by the first coupling section.

The present invention as described in the item (1) is configured as described above. The partitioning portion separating adjacent keys from each other is formed integrally with the top cover. As compared with not only the case where the partitioning portion is not disposed, but also the case where the partitioning portion is disposed but formed as a separate member, therefore, entering of foreign matters such as dust or liquid droplets can be prevented as far as possible from occurring. Furthermore, it is possible to obtain a keyboard apparatus which is excellent also in appearance. Furthermore, an opening area of the top cover is reduced, so that the strength of the keyboard apparatus can be enhanced.

The keyboard apparatus has the first and second coupling section. After the top cover and the frame member are coupled with each other by the first coupling section to configure an upper side portion (a second surface portion) of the keyboard apparatus, a lower side portion (a first surface portion) of the keyboard apparatus which includes the switching section can be coupled with the upper side portion by the second coupling section. As compared with a conventional configuration where the key receiving portions or a frame member having the plurality of key receiving portions is coupled with the lower side portion, and then the top cover is coupled with the coupled member, therefore, the positional alignment between key arrangement spaces surrounded by the partitioning portion of the top cover and the key receiving portions can be easily performed, and the possibility that a gap is formed between a key top and the partitioning portion is reduced. Therefore, it is possible to provide a keyboard apparatus in which entering of foreign matters such as dust or liquid droplets can be further prevented from occurring, and which is further excellent in appearance.

(2) The keyboard apparatus as described in the item (1), wherein the frame member has a rectangular shape, and includes a plurality of split frame members which are formed by splitting the frame member in a longitudinal direction of the frame member.

According to the configuration of the present invention as described in the item (2), even when the dimension of the frame member is changed by shrinkage after resin molding of the frame member, the dimensional change can be suppressed to a degree which is not problematic, the positional alignment between the key arrangement spaces of the top cover and the key receiving portions can be further easily performed, and the possibility that a gap is formed between the key top and the partitioning portion is further reduced. Therefore, it is possible to provide a keyboard apparatus in which entering of foreign matters such as dust or liquid droplets can be further prevented from occurring, and which is further excellent in appearance. In the case where the key layout of the keyboard apparatus is slightly varied depending on the destination, moreover, a common split frame member can be used in a portion which is common in all destinations. Therefore, components can be used commonly, and hence the production cost can be reduced.

(3) The keyboard apparatus as described in the item (2), wherein the plurality of split frame members are formed by splitting the frame member in a manner that, in a case where there exist a plurality of key layouts, at least one part of one key layout is identical to at least one part of each of the other key layouts.

According to the configuration of the present invention as described in the item (3), one split frame member can be configured so as to match the destination. Therefore, the production cost can be further reduced.

(4) The keyboard apparatus as described in any one of the items (1) to (3), wherein the second surface portion includes: the top cover to which coating is applied; and the frame member to which coating is not applied, and the top cover and the frame member are coupled with each other by the first coupling section.

According to the configuration of the present invention as described in the item (4), the top cover can be separated from the frame member, and solely subjected to a coating process. Therefore, the frame member is prevented from being subjected to a coating step. Consequently, the key receiving portions of the frame member can be held to a state where a coating operation is not applied to the portions, and the possibility that the operation of a key movable mechanism portion which is attached for supporting a key so as to be vertically movable is obstructed is eliminated. As a result, the reliability is improved.

(5) The keyboard apparatus as described in the item (1), wherein the first coupling section includes: a plurality of first coupling pins that are provided on the top cover; and a plurality of first projections each having a hole at a middle position thereof, and being provided at a position corresponding to each of the first coupling pins on the frame member.

According to the configuration of the present invention as described in the item (5), since the first projections are formed, the lengths of the holes are substantially extended, so that the effective lengths for positioning between the first coupling pins and the holes can be extended.

Furthermore, when the first coupling pins are thermally welded, an adverse thermal effect to be exerted on the periphery of the hole is reduced by a degree corresponding to heat capacity of the first projections. Specifically, it is possible to prevent the partitioning portion from being deformed during the thermal welding process.

(6) The keyboard apparatus as described in the item (1), wherein the second coupling section includes: a plurality of second projections each having a circular shape, and being provided on the frame member; a third projection that has a slender shape, and that is provided on each of the second projections; and a second coupling pin that has a columnar shape, and that is provided on a middle of the third projection.

According to the configuration of the present invention as described in the item (6), since the second projections are engaged with holes which are disposed at positions corresponding to the second coupling pins in a sheet switch, the sheet switch is positioned with respect to the top cover. Namely, both the split frame member and the sheet switch are positioned with respect to the top cover.

Further, since the third projection has the slender shape, the split frame member and the sheet switch are more accurately positioned with respect to the top cover.

(7) According to a second aspect of the present invention, an electronic apparatus includes: a key input apparatus including: a plurality of keys; a switching section that detects depression of each of the keys; a top cover that is integrally formed with a partitioning portion separating adjacent keys from each other; a frame member that includes a plurality of key receiving portions which, in a case where the frame member is attached to the top cover, support the keys in a manner that the keys are placed in spaces surrounded by the partitioning portion; a first coupling section that couples the top cover with the frame member; and a second coupling section that couples a first surface portion of the key input apparatus including the switching section, with a second surface portion of the key input apparatus including the top cover and the frame member with which the top cover is coupled by the first coupling section.

According to the configuration of the present invention as described in the item (7), in the key input apparatus of the electronic apparatus, the partitioning portion separating adjacent keys from each other is formed integrally with the top cover. As compared with not only the case where the partitioning portion is not disposed, but also the case where the partitioning portion is disposed but formed as a separate member, therefore, entering of foreign matters such as dust or liquid droplets can be prevented as far as possible from occurring. Furthermore, it is possible to obtain a key input apparatus which is excellent also in appearance. Furthermore, an opening area of the top cover is reduced, so that the strength of the key input apparatus can be enhanced.

The keyboard apparatus has the first and second coupling section. After the top cover and the frame member are coupled with each other by the first coupling section to configure the upper side portion (second surface portion) of the keyboard apparatus, the lower side portion (first surface portion) of the keyboard apparatus which includes the switching section can be coupled with the upper side portion by the second coupling section. As compared with a conventional configuration where key receiving portions or a frame member having a plurality of key receiving portions is coupled with the lower side portion, and then a top cover is coupled with the coupled member, therefore, the positional alignment between key arrangement spaces surrounded by the partitioning portion of the top cover and the key receiving portions can be easily performed, and the possibility that a gap is formed between the key top and the partitioning portion is reduced. Therefore, it is possible to provide a key input apparatus in which entering of foreign matters such as dust or liquid droplets can be further prevented from occurring, and which is further excellent in appearance.

It is possible to provide an electronic apparatus having the key input apparatus which can achieve the various effects described above.

(8) According to a third aspect of the present invention, a method of producing a keyboard apparatus including a plurality of keys and a switching section for detecting depression of each of the keys, the method including the steps of: coupling a top cover in which a partitioning portion separating adjacent keys from each other is integrally formed, and a frame member including a plurality of key receiving portions that, in a case where the frame member is attached to the top cover, support the keys in a manner that the keys are placed in spaces surrounded by the partitioning portion, by a first coupling section; and coupling a first surface portion of the keyboard apparatus including the switching section, with a second surface portion of the keyboard apparatus including the top cover and the frame member with which the top cover is coupled by the first coupling section, by a second coupling section.

According to the method of producing a keyboard apparatus of the present invention as described in the item (8), the partitioning portion separating adjacent keys from each other is formed integrally with the top cover. As compared with not only the case where the partitioning portion is not disposed, but also the case where the partitioning portion is disposed but formed as a separate member, therefore, entering of foreign matters such as dust or liquid droplets can be prevented as far as possible from occurring. Furthermore, it is possible to obtain a keyboard apparatus which is excellent also in appearance. Furthermore, an opening area of the top cover is reduced, so that the strength of the keyboard apparatus can be enhanced.

The keyboard apparatus has the first and second coupling section. After the top cover and the frame member are coupled with each other by the first coupling section to configure the upper side portion of the keyboard apparatus, the lower side portion of the keyboard apparatus which includes the switching section can be coupled with the upper side portion by the second coupling section. As compared with a conventional configuration where key receiving portions or a frame member having a plurality of key receiving portions is coupled with a lower side portion, and then a top cover is coupled with the coupled member, therefore, the positional alignment between key arrangement spaces surrounded by the partitioning portion of the top cover and the key receiving portions can be easily performed, and the possibility that a gap is formed between the key top and the partitioning portion is reduced. Therefore, it is possible to provide a method of producing a keyboard apparatus in which entering of foreign matters such as dust or liquid droplets can be further prevented from occurring, and which is further excellent in appearance.

As described above, according to the keyboard apparatus of the present invention and the method of producing the keyboard apparatus, the partitioning portion separating adjacent keys from each other is formed integrally with the top cover. Therefore, entering of foreign matters such as dust or liquid droplets can be prevented as far as possible from occurring, and it is possible to obtain a keyboard apparatus which is excellent also in appearance. Furthermore, the strength of the keyboard apparatus can be enhanced.

In the case where the frame member is configured by the split frame members which are obtained by splitting the frame member in the longitudinal direction of the frame member, when the key layout of the keyboard apparatus is slightly varied depending on the destination, a common split frame member can be used as the frame member in a portion which is common in all destinations. Therefore, components can be used commonly, and hence the production cost can be reduced.

In the case where the top cover to which coating is applied, and the frame member to which coating is not applied are coupled with each other by the first coupling section to configure the upper side portion of the keyboard apparatus, the top cover can be separated from the frame member, and solely coated. Therefore, the frame member is prevented from being subjected to a coating step. Consequently, the key receiving portions of the frame member can be held to a state where a coating operation is not applied to the portions, and the possibility that the operation of the key movable mechanism portion which is attached for supporting a key so as to be vertically movable is obstructed is eliminated. As a result, the reliability is improved.

Furthermore, it is possible to provide an electronic apparatus having a key input apparatus to which the keyboard apparatus that can achieve the various effects described above is applied.

BRIEF DESCRIPTION OF THE DRAWINGS

Exemplary embodiments of the present invention will be described in detail with reference to the attached drawings, wherein.

DETAILED DESCRIPTION OF THE INVENTION

When a keyboard apparatus is to be configured, a top cover which is in an outer and upper side portion where keys are arranged is formed as a member in which a partitioning portion separating adjacent keys from each other is integrally formed. In a lower portion of a space surrounded by the partitioning portion where the keys of the top cover are placed, key receiving portions for disposing key movable mechanism portions for enabling a vertical movement of the key are attached, and at least the key movable mechanism portions for the keys are attached with using the key receiving portions, thereby configuring the upper side portion of the keyboard apparatus. To the upper side portion, therefore, components which are placed in a lower side (specifically, components configuring a lower side portion of the keyboard apparatus, such as a sheet switch having electrical contacts serving as membrane switches which perform on/off operations in accordance with the existence/nonexistence of depression, a back plate which reinforces the sheet from the back side, and a bottom cover) are coupled by a second coupling section.

The key receiving portions are disposed on a frame member to which coating is not applied, the frame member and the top cover to which coating is applied are coupled with each other by a first coupling section to configure the upper side portion of the keyboard apparatus. The frame member is configured by a plurality of split frame members which are obtained by splitting the frame member in the longitudinal direction of the frame member.

(Embodiments)

Figure 1:
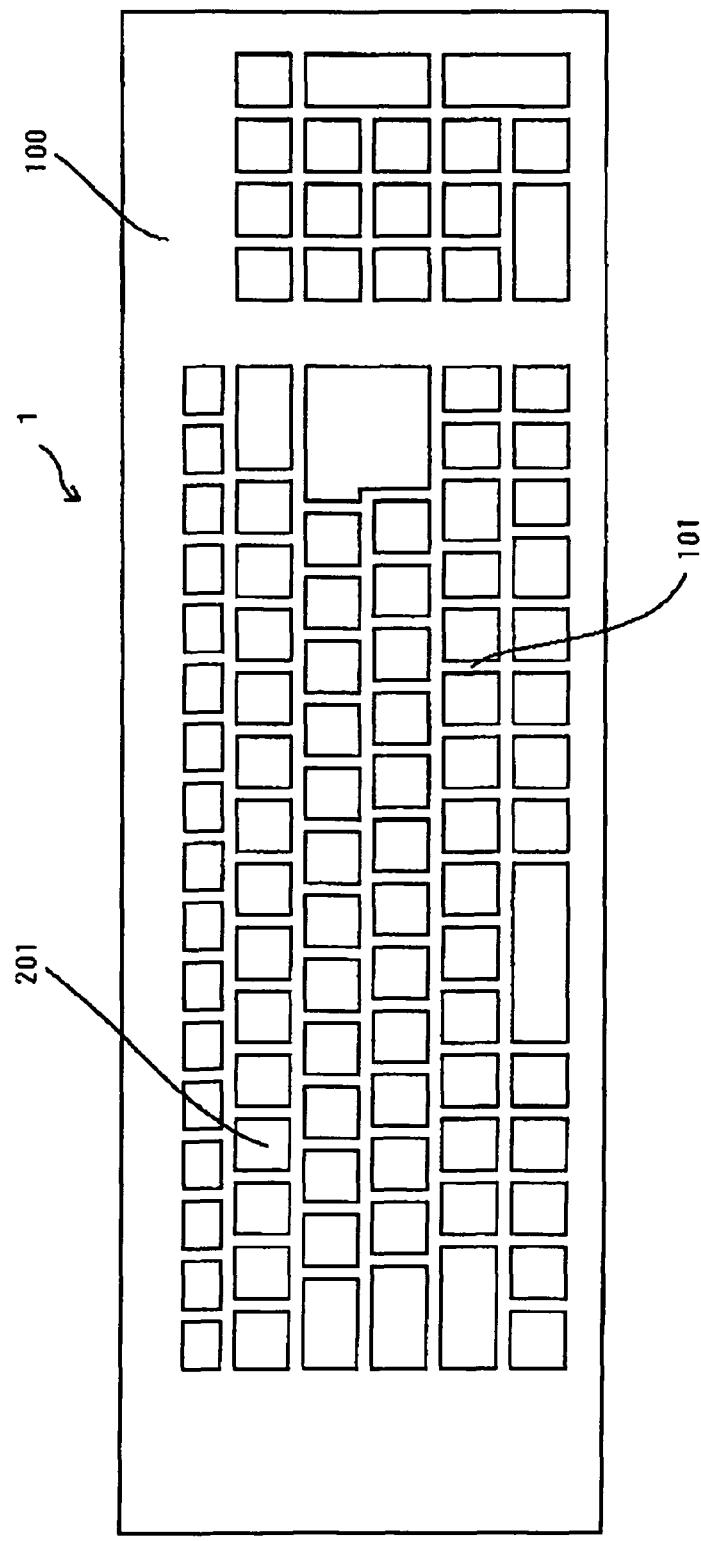
FIG. 1 is a view showing an appearance of a keyboard apparatus according to a preferred embodiment of the present invention.

FIG. 1 is an external view of a keyboard apparatus 1 according to a preferred embodiment of the present invention seen from the upper side. As shown in the figure, in a top cover 100, a partitioning portion 101 which separates adjacent keys from each other is integrally molded. According to the configuration, it is possible to prevent foreign matters such as dust or liquid droplets from entering through gaps between keys. Moreover, there is no interface other than the interface between key caps (key tops) and the partitioning portion 101. Unlike the case where the partitioning portion 101 is configured by a member separate from the top cover 100, therefore, the interface does not function as a place where there is a possibility that foreign matters such as dust or liquid droplets enter. Furthermore, the keyboard apparatus can be configured to be excellent also in appearance, and, since an opening area of the top cover is reduced, the strength of the keyboard apparatus can be enhanced.

The partitioning portion 101 has a width of, for example, about 2.5 mm. When the thus configured partitioning portion 101 is provided, it is possible to form a predetermined gap between adjacent operation keys, and allows the side face of the key top to have a simple rectangular shape, with the result that the keyboard apparatus can be made excellent in operability, productivity, and design.

Figure 2A:
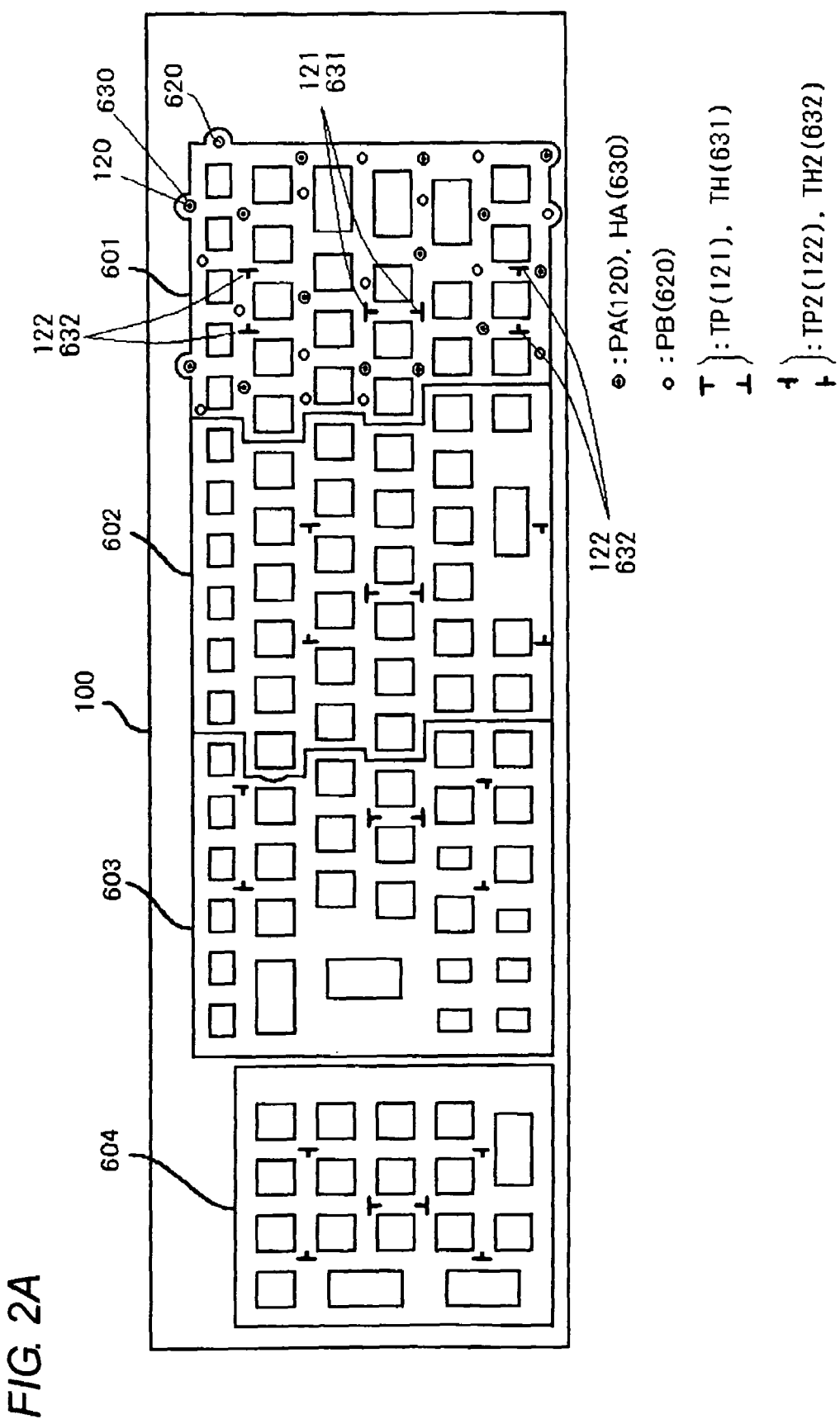
FIG. 2A is a bottom view of an upper side portion of the keyboard apparatus of the present invention.

FIG. 2A is a view in which a state where the frame member is coupled with the top cover 100 is viewed from the back side. Reference numerals 601, 602, 603 and 604 denote split frame members which are formed by splitting the frame member into a plurality of pieces (in the embodiment, four) in the longitudinal direction of the keyboard apparatus 1. In the figure, only holes into which the key movable mechanism portion is to be inserted are indicated by squares. However, the key receiving portion which will be described later is disposed in an end portion of each of the holes. Coupling pins and coupling holes are drawn only in the split frame member 601. The pins and the holes of the other split frame members are configured basically in the same manner, hence are not shown. In the embodiment, the frame member is split into three pieces in a main portion of the keyboard apparatus 1, and, in a numerical keypad portion beside the main portion, the further split frame member 604 is used.

In an extreme case, the splitting of the frame member may be performed so that one split frame member (in this case, a plate having one key receiving portion) is formed for one key. When the split number is excessively large, however, the component number becomes large, and the number of assembling steps is increased, with the result that the production cost is increased. Therefore, it is preferable that the split number is as small as possible. By contrast, when an individual frame member is excessively long in the longitudinal direction, there arises the above-described problem due to shrinkage of after resin molding. A desktop keyboard apparatus which is used in a desktop personal computer has a size in which the key pitch is 19 mm and the total width is about 390 to 480 mm in the case where a numerical keypad portion is provided. In such a keyboard apparatus, when the main portion is split into three pieces as shown in FIG. 2A, one split frame member which is longer has a length corresponding to six keys in the longitudinal direction of the keyboard apparatus, or a length of about 114 mm. It has been confirmed by the inventors that, in the case where, in a keyboard apparatus provided with a partitioning portion, keys are accurately positioned and arranged in zones surrounded by the partitioning portion, when each split frame member has such a length, the influence of shrinkage of after resin molding on the accuracy of key positioning is not so large.

In the coupling of the split frame members 601, 602, 603 and 604 with the top cover 100, the positioning is performed in the following manner. Pins 121 having a T-like section are projected from the top cover 100, T-like holes 631 are disposed at positions on the side of the split frame members and corresponding to the pins, and the T-like pins 121 are inserted into the T-like holes 631. In FIG. 2A, for example, the T-like pins 121 and T-like holes 631 which are indicated by a T-shaped symbol may be disposed in one or a plurality of sets (in the embodiment, two sets) in the vicinity of the middle of each of the split frame members 601, 602, 603 and 604.

In FIG. 2A, reference numeral 120 indicated in the right-end split frame member 601 denotes a first coupling pin PA which is projectingly disposed on the top cover 100 in order to couple the split frame member 601 with the top cover 100. Reference numeral 630 denotes a hole HA through which the first coupling pin PA is to be passed. The hole is opened in the split frame member 601 correspondingly with the position where the first coupling pin PA is disposed on the top cover 100. The first coupling pin 120 is passed through the hole 630, the split frame member 601 is placed on the top cover 100 which is reversed, a tip end portion of the first coupling pin 120 is heated to be collapsed and welded to the split frame member 601, thereby fixing the split frame member 601 to the top cover 100.

As shown in the example of FIG. 2A, the first coupling pin 120 and the hole 630 are disposed in a plural number over the whole surface of the split frame member 601, so that the split frame member 601 is firmly fixed to the top cover 100. Although, also in the other split frame members, a plurality of sets of the first coupling pin 120 and the hole 630 are disposed in order to fix the members to the top cover 100, they are not particularly shown in the figure. The manner of fixing the other split frame members to the top cover 100 is similar to the manner of fixing the split frame member 601 to the top cover 100.

Hereinafter, the example of the first coupling pins 120 will be described in more detail.

In addition, the first coupling pins and the holes are shown only in the split frame member 601. The coupling pins and holes of the other split frame members 602, 603 and 604 are configured basically in the same manner, and hence are not shown.

Figure 3:
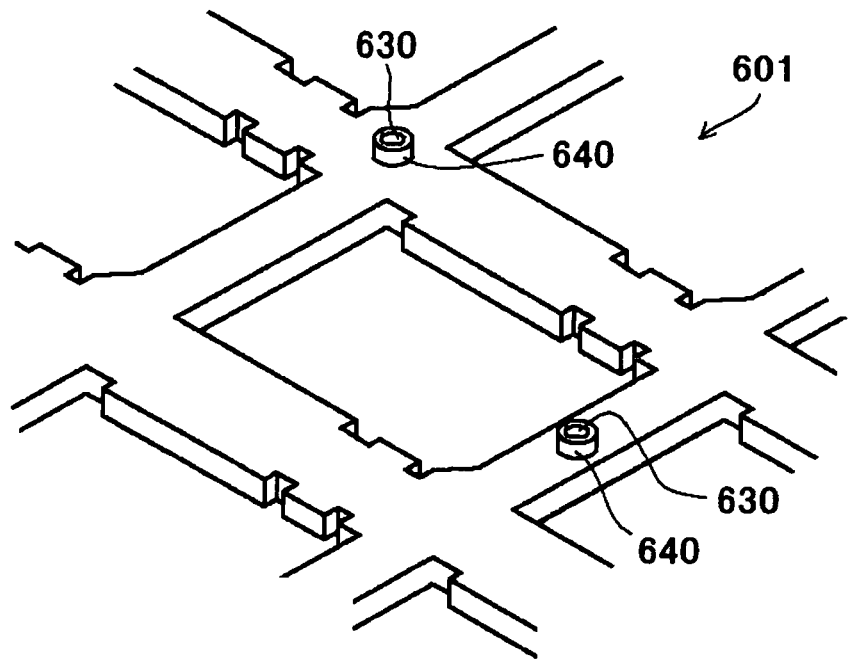
FIG. 3 is a view showing in detail an example of a first coupling section.
Figure 3:
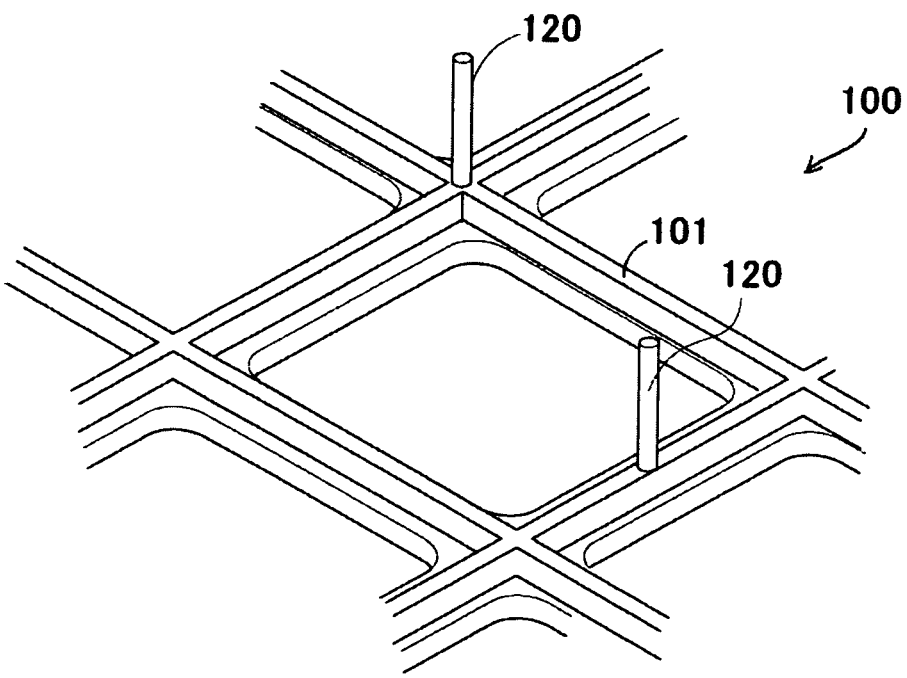

FIG. 3 shows the manner in which the first coupling pins 120 for fixing the split frame member 601 to the top cover 100 are disposed at predetermined positions of the rear face of the top cover 100. From the viewpoint of strength, it is preferable that the first coupling pins 120 are disposed as far as possible at positions where bars of the partitioning portion 101 intersect with each other.

A part of the split frame member 601 is shown in the upper portion of FIG. 3.

Similarly with the top cover 100, the split frame member 601 is made of a thermoplastic resin such as ABS, and integrally formed by injection molding.

The plurality of holes 630 which pass through the split frame member 601 are disposed at positions corresponding to the first coupling pins 120 disposed in the top cover 100.

Specifically, the holes 630 and the first coupling pins 120 have the following shape and size:

The first coupling pins 120: columnar shape, diameter of 1 mm, height of 2.5 mm; and The holes 630: cylindrical shape, diameter of 2 mm, length of 1 mm (the thickness of the split frame member 601 is 0.8 mm).

Projections (first projections) 640 which are raised by about 0.2 mm from the rear face of the split frame member 601 are formed in the peripheries of the holes 630 in the rear face of the split frame member 601. The projections 640 have a diameter of 4 mm. Namely, the structure is formed where each of the holes 630 is concentrically disposed at the middle of the corresponding projection 640. Since such the projections 640 are formed, the lengths of the holes 630 are substantially extended, so that the effective lengths for positioning between the first coupling pins 120 and the holes 630 can be extended. When the tip end portion of the first coupling pins 120 are thermally welded, an adverse thermal effect to be exerted on the periphery of the hole 630 is reduced by a degree corresponding to heat capacity of the projections 640. Specifically, it is possible to prevent the partitioning portion 101 from being deformed during the thermal welding process.

On each of the split frame members 601, 602, 603 and 604, a plurality of second coupling pins 620 which are used for coupling a back plate 400 while interposing a sheet switch 300 are projectingly disposed. Alternatively, the second coupling pins 620 may not be disposed on the split frame members, but disposed on the top cover 100, and larger holes may be formed in the split frame members, so that the second coupling pins 620 remain to be projected even after the top cover 100 is coupled with the split frame members. Tip end portions of the second coupling pins 620 are heated to be collapsed and welded to the back plate 400, whereby the back plate 400 is coupled with an upper side portion 150 including the top cover 100 and the split frame members.

Hereinafter, the example of the second coupling pins 620 will be described in more detail.

In addition, the second coupling pins and the holes are shown only in the split frame member 601. The second coupling pins and holes of the other split frame members 602, 603 and 604 are configured basically in the same manner, and hence are not shown.

Figure 4:
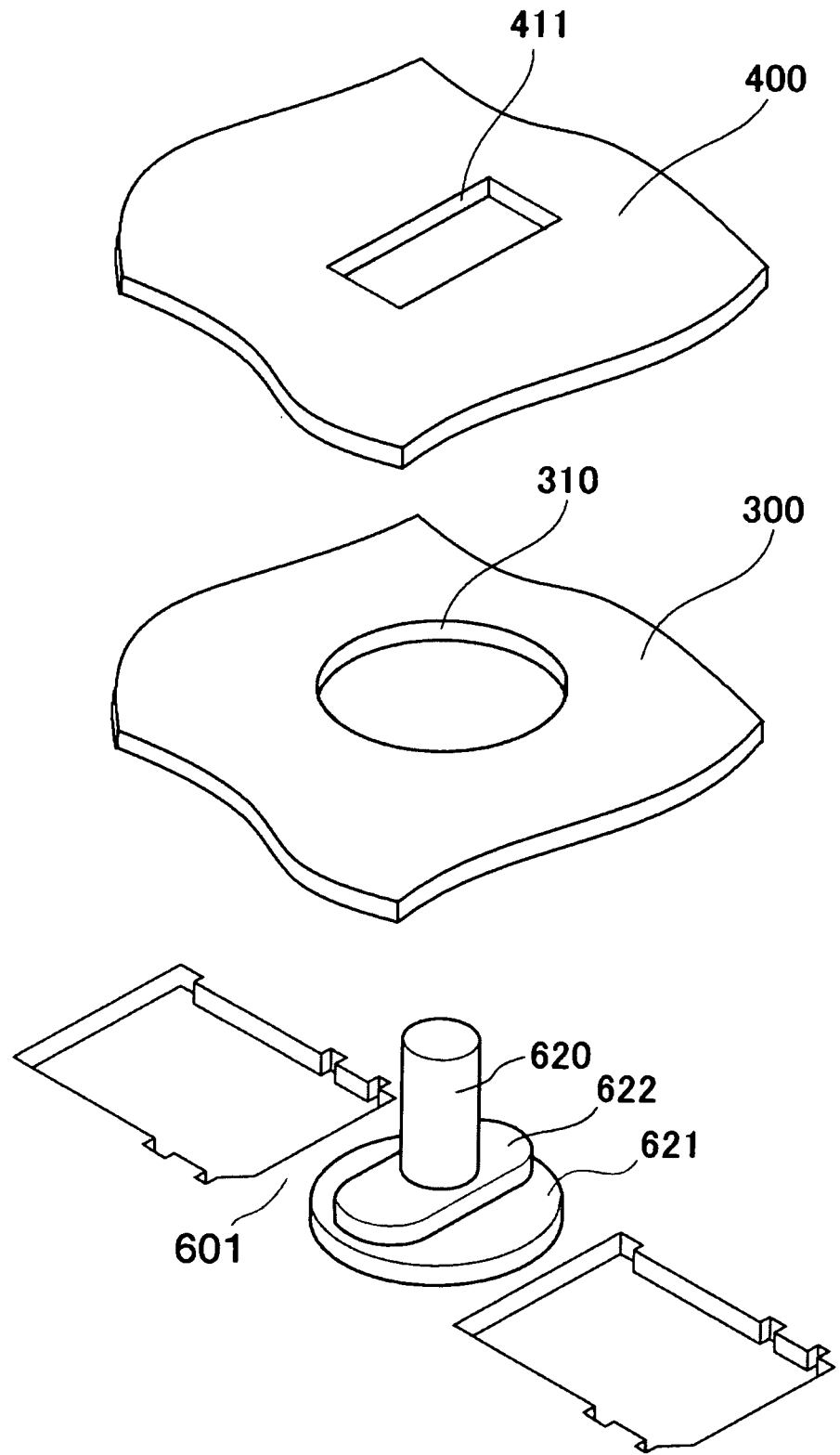
FIG. 4 is a view showing in detail an example of a second coupling section.

As shown in FIG. 4, the plurality of second coupling pins 620 for fixing the back plate 400 to the split frame member 601 are disposed at predetermined positions of the rear face of the split frame member 601, in a state where the sheet switch 300 is interposed. The second coupling pins 620 have a columnar shape. Slender projections (third projections) 622 having a slender shape are formed on circular projections (second projections) 621 which are circular in a plan view, and the second coupling pins 620 are disposed at substantial middles of the slender projections 622. Since the slender projections 622 are disposed, the back plate 400 can be positioned more accurately. The back plate 400 is fixed to the split frame member 601 by using the second coupling pins 620.

The back plate 400 is formed by applying a pressing process on a metal material such as SECC.

When the back plate 400 is made of such a metal material, the strength and the sense of key touch can be improved.

In the sheet switch 300, as shown in FIG. 4, holes 310 are disposed at positions corresponding to the second coupling pins 620. When the circular projections 621 which are provided under the second coupling pins 620 are engaged with the holes 310, the sheet switch 300 is positioned with respect to the top cover 100. Namely, both the split frame member 601 and the sheet switch 300 are positioned with respect to the top cover 100.

Figure 8:
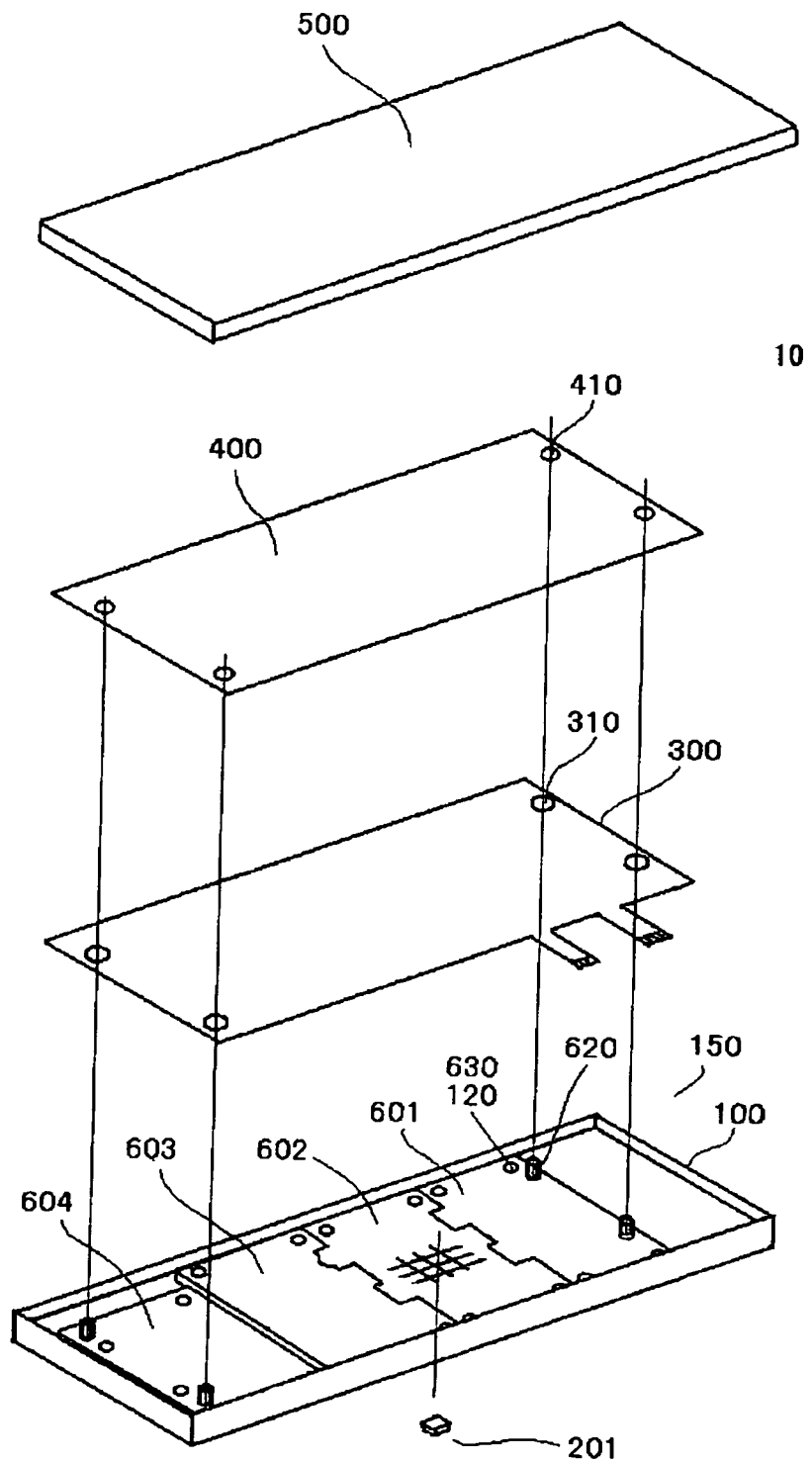
FIG. 8 is an exploded perspective view of the keyboard apparatus of the present invention.

In the back plate 400, holes 410 are indicated in a circular shape in FIG. 8, but, in FIG. 4, indicated as holes 411 which have a substantially same shape as the slender projections 622 disposed in the split frame member 601.

The slender projections 622 disposed in the split frame member 601 are inserted into the holes 411, and thereafter tip end portions of the second coupling pins 620 which are disposed at substantial middles of the slender projections—622 are thermally welded, and the back plate 400 is fixed to the split frame member 601.

Figure 5A:
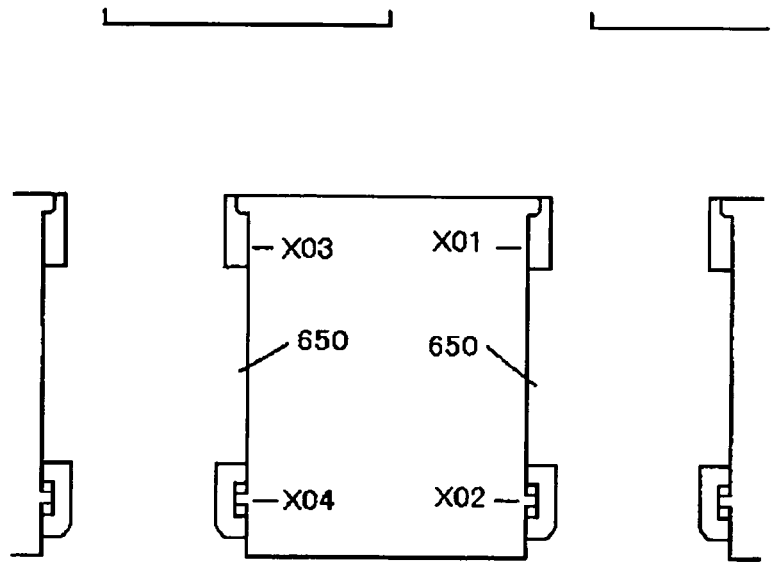
FIGS. 5A and 5B are views illustrating a key receiving portion disposed in a split frame member of the keyboard apparatus of the present invention.
Figure 5B:
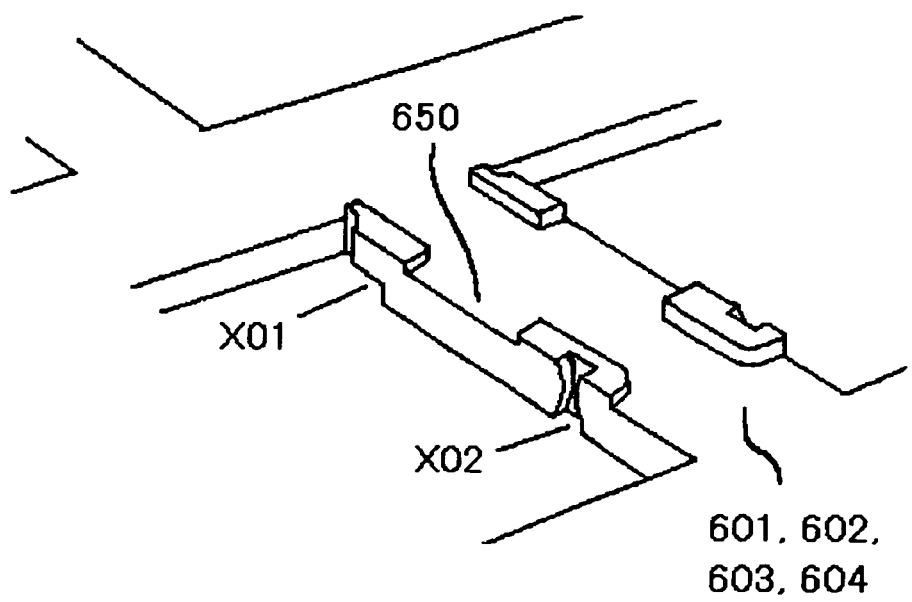
Figure 13:
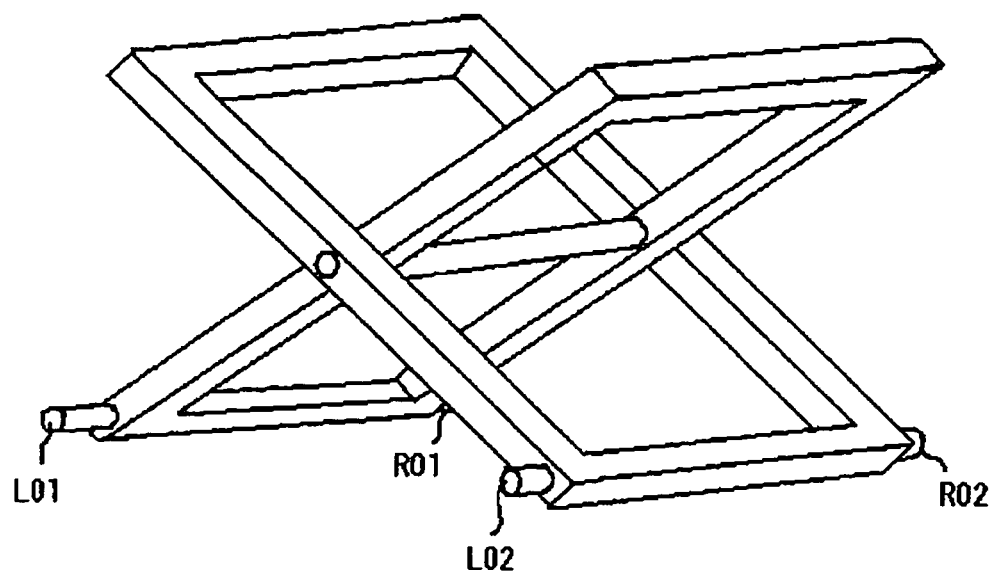
FIG. 13 is a view showing a pantograph structure functioning as a key movable mechanism portion.

Each of the split frame members 601, 602, 603 and 604 has a plurality of holes (openings) which have a rectangular shape in a plan view. Through the holes, key movable mechanism portions 250 are inserted from the rear sides of the split frame members so as to be supported by the key receiving portions which are disposed in the peripheries of the holes. FIG. 5A is a view in which, focusing on one key receiving portion 650, a part of the split frame member is seen from the upper side, and FIG. 5B is a perspective view as seen from an obliquely upper side. Pins R01, R02, L01 and L02 of the key movable mechanism portion 250 shown in FIG. 13 are fittingly inserted into a plurality of recesses which are formed in the key receiving portion 650, and which are denoted by X01, X02, X03 and X04 in FIG. 5A, respectively. The pins R01, R02, L01 and L02 are received by the recesses X01, X02, X03 and X04, respectively.

As shown in FIG. 5B, X01 denotes the recess which is on the rear side of the split frame member, and which has a certain length so as to allow the pin R01 to be inserted into the recess, and to perform together with a rotating or sliding movement in an anteroposterior direction of the pantograph structure of the key movable mechanism portion 250. Similarly, X02 denotes the recess which is on the rear side of the split frame member, and the pin R02 is inserted into the recess X02 so that, in accordance with a vertical movement of the pantograph structure, the pin R02 can perform only a rotating movement while the pin is fixed in the anteroposterior direction. The recesses X03 and X04 are bilaterally symmetrical to the recesses X01 and X02, respectively, and have the same structure as the recesses X01 and X02. The structures and operations of the recesses and the pins are identical with those of a usual pantograph type key switch. Hence, their detailed description will be omitted.

When the back plate 400 is coupled via the sheet switch 300 to the upper side portion 150 of the keyboard apparatus 1 which is obtained by coupling the top cover 100 with the split frame members 601, 602, 603 and 604, the sheet switch 300 is attached to the back face, and the pins R01, R02, L01 and L02 which are inserted into the recesses X01, X02, X03 and X04 are enclosed in spaces formed by the recesses X01, X02, X03 and X04.

Figure 6:
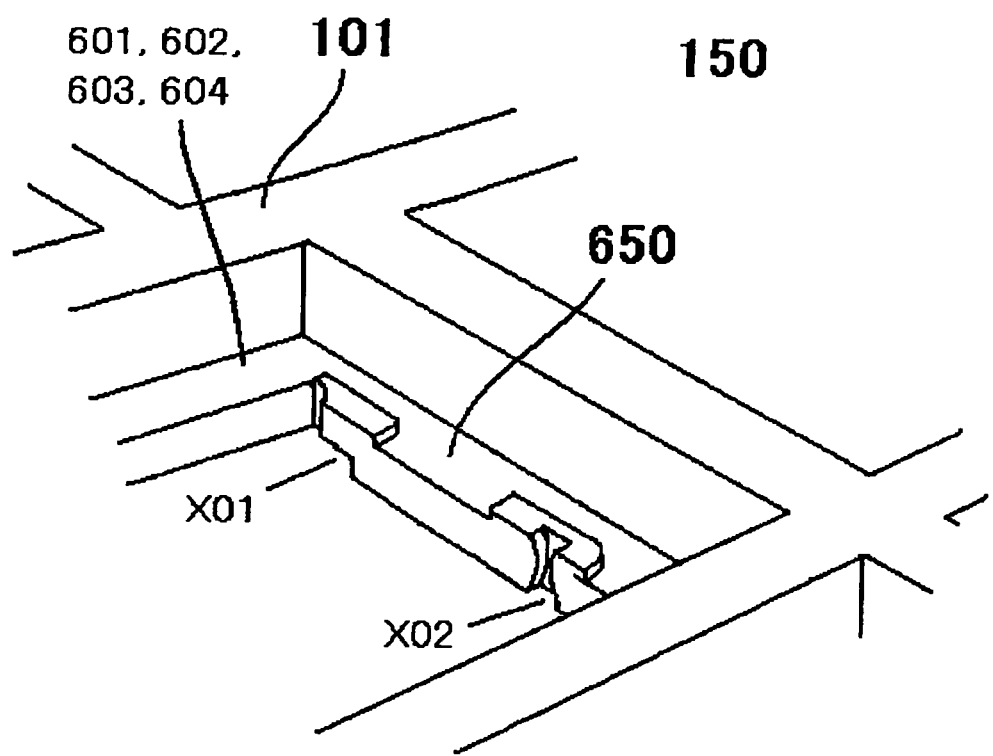
FIG. 6 is a perspective view enlargedly showing a partitioning portion and a key receiving portion of an upper side portion of the keyboard apparatus of the present invention.

FIG. 6 is a perspective view in which, when the top cover 100 is coupled with the split frame members 601, 602, 603 and 604, a zone surrounded by the partitioning portion 101 is seen from an obliquely upper side. FIG. 6 shows in detail the manner in which the key receiving portion 650 disposed in the split frame member is placed while being opposed to the zone. In this way, the top cover 100 and the split frame members are overlappingly placed so that the key receiving portions 650 disposed in the split frame members and having the recesses X01, X02, X03 and X04 appear in lower portions of window-like zones surrounded by the partitioning portion 101 disposed in the top cover 100. The present invention is directed to a configuration where, at this time, misfit in the positional relationship between the window-like zone and the key receiving portion 650 is suppressed, and the gap between a key cap 201 and the partitioning portion 101 is made as small as possible.

In the positional relationship between the window-like zone and the key receiving portion 650, when the top cover 100 and the key receiving portion 650 are integrally molded, the positional relationship is not changed. There is a case where the top cover 100 is to be coated from the viewpoint of appearance. In this case, when the top cover 100 and the key receiving portion 650 are integrally molded, also the recesses X01, X02, X03 and X04 are coated. Then, the friction forces which, when a key is depressed, are exerted during a rotating or sliding movements of the pins R01, R02, L01 and L02 of the key movable mechanism portion 250 in the recesses X01, X02, X03 and X04 are increased, thereby producing a possibility that a smooth operation of the key is impaired. Therefore, a coating process must be conducted after the key receiving portion 650 is covered so as not to be coated. As a result, there arises a problem in that the number of processes is increased, and the production cost is increased. According to the present invention, therefore, the split frame members 601, 602, 603 and 604 are configured so as to be separated from the top cover 100, and, after coating is applied only to the top cover 100, the split frame members having the key receiving portions 650 are attached to the top cover 100 to be integrated therewith.

When the dimension of a frame member in the longitudinal direction is large, the length is changed by shrinkage after resin molding, thereby causing a problem in that the frame member cannot be accurately positioned with respect to the zones surrounded by the partitioning portion 101 of the top cover 100, and the gap between the key cap 201 and the partitioning portion 101 is increased. In order to avoid such a situation from occurring, the frame member is split into a plurality of pieces.

Because of the configuration where the frame member is split into the split frame members 601, 602, 603 and 604, even in the case where the key layout of the keyboard apparatus is slightly varied depending on the destination, a common split frame member can be used in a portion which is common in all destinations. Therefore, components can be commonly used, and hence the production cost can be reduced. Furthermore, the configuration has advantages such that key layout portions which are varied depending on the destinations can be assembled in one split frame member, and the production cost can be further reduced.

The common use of components due to the configuration where the split frame members are used will be described in more detail with reference to FIGS. 2C to 2E.

Figure 2B:
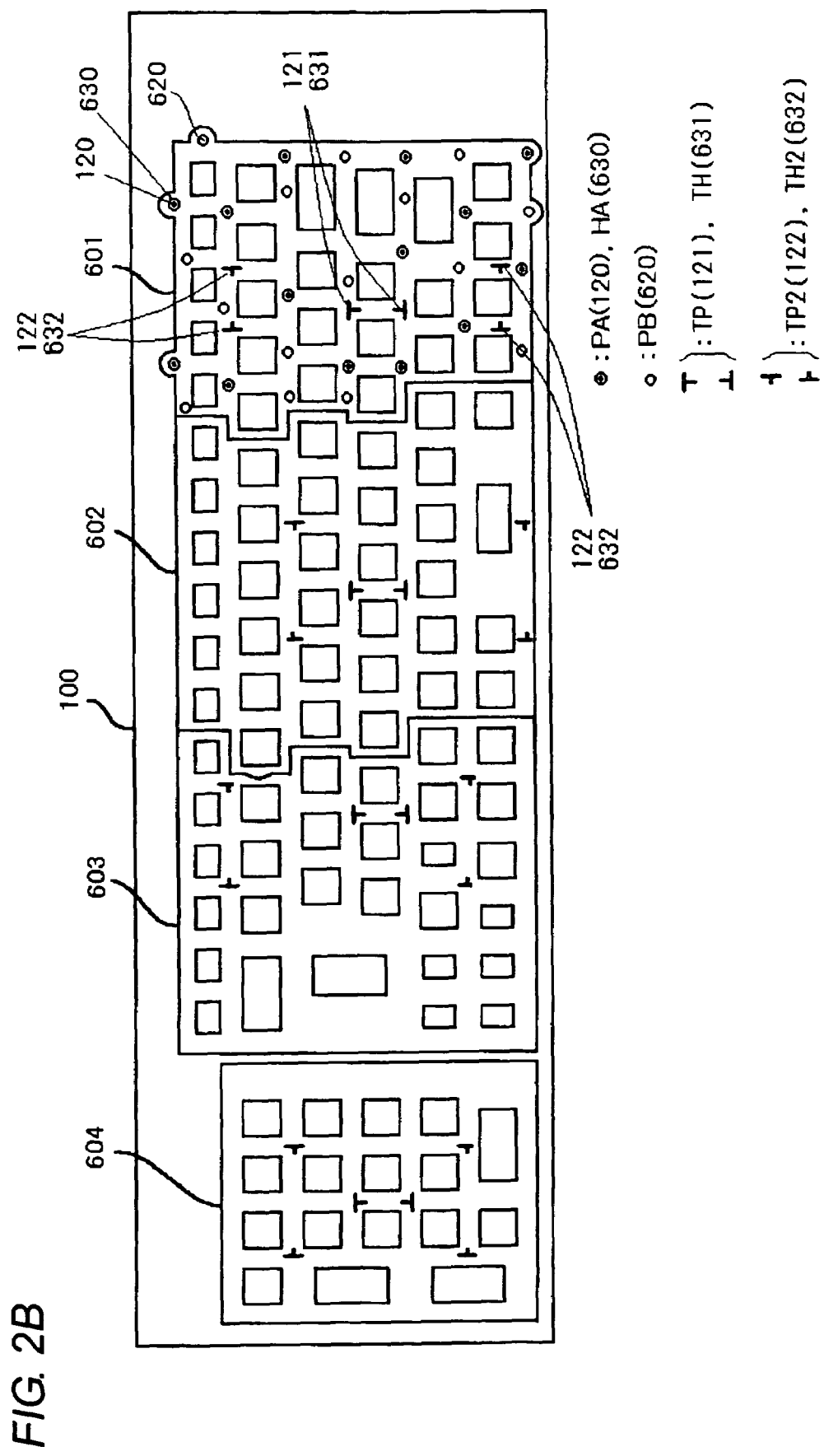
FIG. 2B is a bottom view of an upper side portion of another embodiment of the keyboard apparatus of the present invention.
Figure 2C:
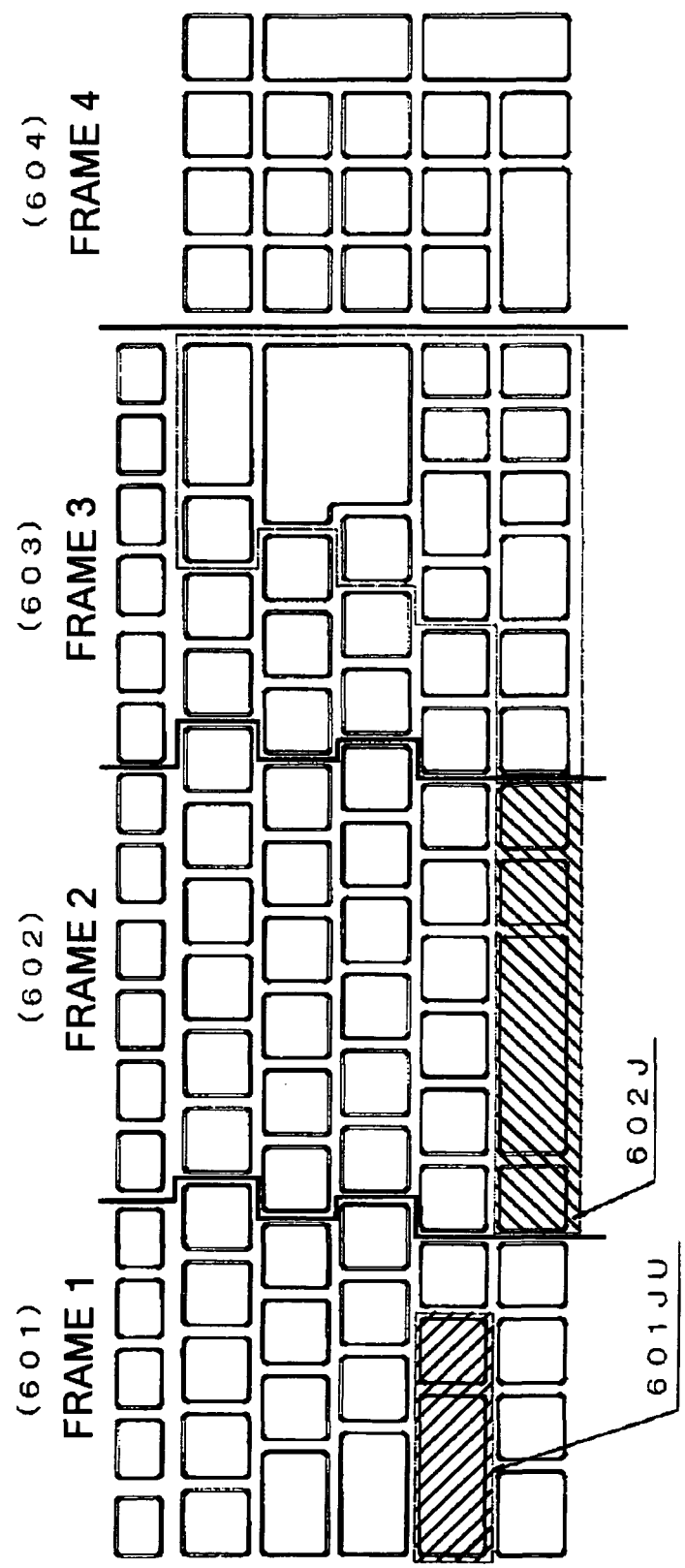
FIG. 2C is a view illustrating advantages of common use of components caused by the use of a split frame member.

A keyboard apparatus comprising FRAME1 to FRAME4 shown in FIG. 2C is a product for J-district. In the FRAME1 (corresponding to a region of the split frame member 601), with respect to the portion indicated by 601JU, a product for E-district is different from products for other districts, but products for J- and U-districts can be commonly used. Therefore, the split frame member 601 can be commonly used in products for J- and U-districts. By contrast, in the FRAME2 (corresponding to a region of the split frame member 602), the portion indicated by 602J is applied only to a product for J-district, and is used in a different manner in products for U- and E-districts. Therefore, the split frame member 602 can be used only in a product for J-district.

Figure 2D:
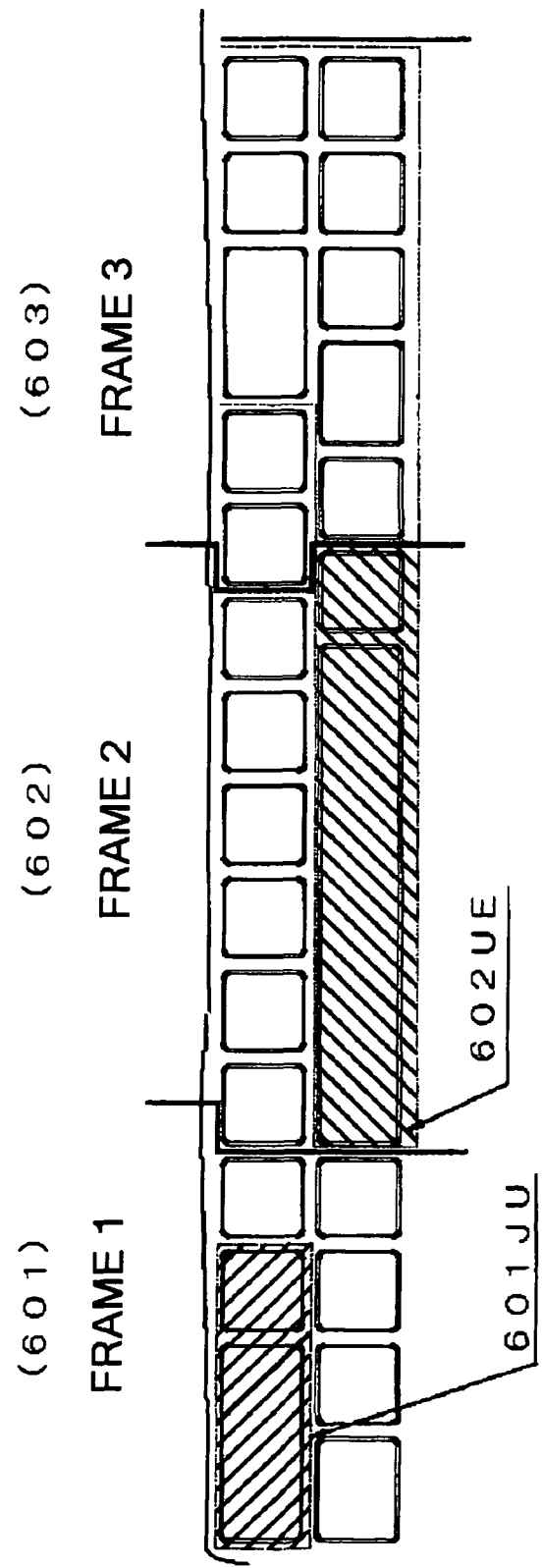
FIG. 2D is an another view illustrating advantages of common use of components caused by the use of a split frame member.

Next, a keyboard apparatus comprising FRAME1 to FRAME3 shown in FIG. 2D is a product for U-district. In the FRAME2 (corresponding to a region of the split frame member 602), with respect to the portion indicated by 602UE, a product for J-district is different from products for other districts, but products for U- and E-districts can be commonly used. Therefore, the split frame member 602 can be commonly used in products for U- and E-districts.

Figure 2E:
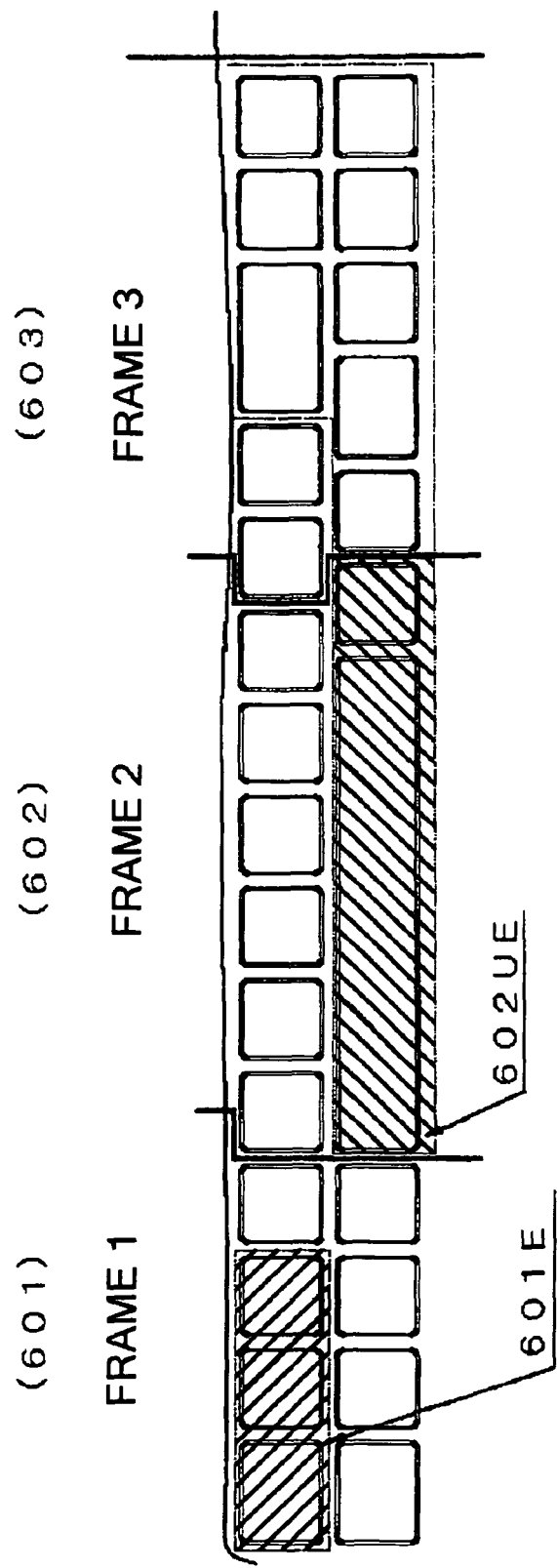
FIG. 2E is a further view illustrating advantages of common use of components caused by the use of a split frame member.

A keyboard apparatus comprising FRAME1 to FRAME3 shown in FIG. 2E is a product for E-district. In the FRAME1 (corresponding to a region of the split frame member 601), the portion indicated by 601E is applied only to a product for E-district, and used in a different manner in products for J- and U-districts. Therefore, the split frame member 601 can be used only in a product for E-district.

As described above, when the frame member is split, a part of the split frame members can be commonly used in products for different districts. In this case, there is an advantage that it is not required to prepare different frame members for all districts. Specific examples of such a plurality of key layout specifications in which a part of the key layout is different and another part of the key layout is identical are the relationship between a so-called 109 keyboard (FIG. 2C) and a 104 keyboard (FIG. 2D), and the relationship between a 104 keyboard (FIG. 2D) and a 105 keyboard (FIG. 2E).

Figure 7:
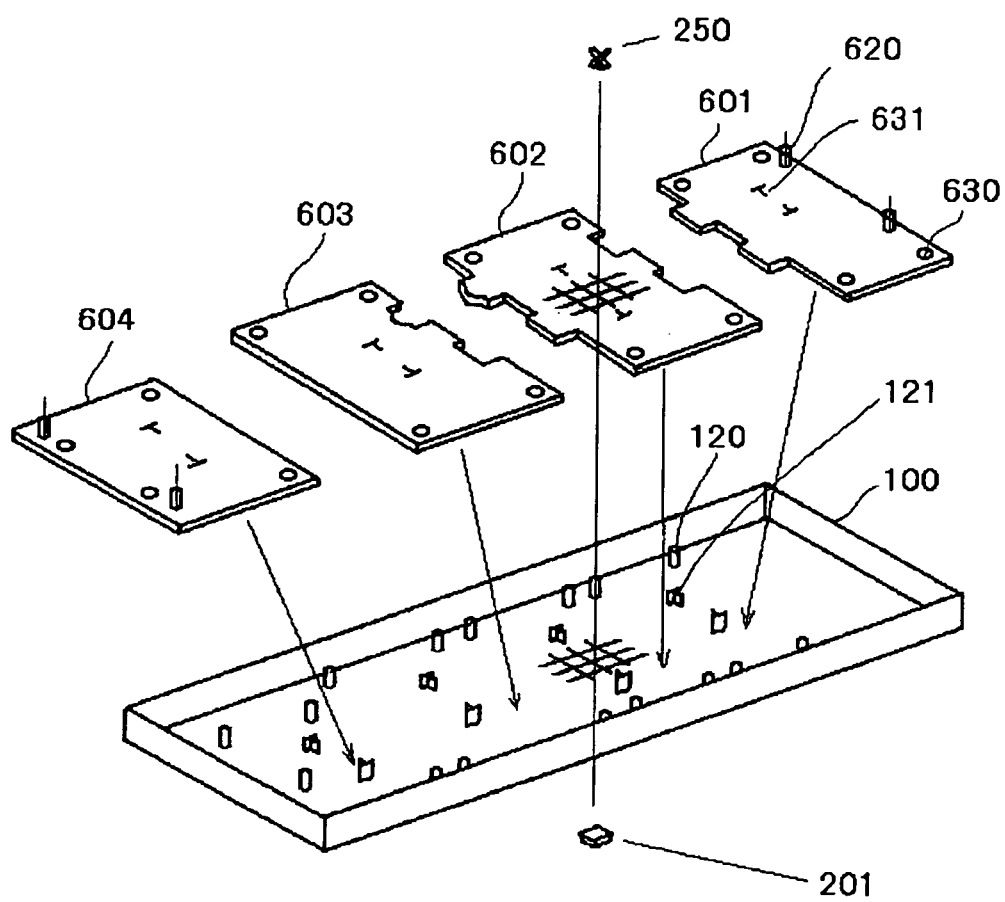
FIG. 7 is an exploded perspective view showing an assembly structure of the upper side portion of the keyboard apparatus of the present invention.

FIG. 7 is an exploded perspective view illustrating an assembling work for coupling the top cover 100 with the split frame members 601, 602, 603 and 604 to obtain the upper side portion 150 shown in FIG. 8, and showing the assembly structure of the upper side portion 150. On the rear face of the top cover 100, as shown in the figure, a plurality of the first coupling pins 120 functioning as the first coupling section are disposed at positions corresponding to the plurality of holes 630 which are disposed in each of the split frame members 601, 602, 603 and 604. Moreover, the two T-like pins 121 which are used for positioning as described above are disposed on each of the split frame members.

In each of the split frame members 601, 602, 603 and 604, the T-like pins 121 are inserted into the T-like holes 631, and at the same time the first coupling pins 120 functioning as the first coupling section for the split frame member are inserted into the holes 630 of the split frame member. Furthermore, the tip end portion of the first coupling pins 120 projecting from the holes 630 are heated to be collapsed and welded to the split frame member, whereby the split frame member is firmly coupled with the top cover 100. In this way, the top cover 100 and the split frame members 601, 602, 603 and 604 are integrated with one another as the upper side portion 150 of the keyboard apparatus 1.

As described above, the plurality of window-like holes which are disposed in each of the split frame members 601, 602, 603 and 604 have the key receiving portions 650 in their peripheries, and are used for receiving the key movable mechanism portions 250. Among these holes, only those in the split frame member 602 are shown in FIG. 7 in a simplified or lattice-like manner. The holes of the other split frame members are configured in a similar manner, and specifically have the structure shown in FIGS. 5A and 5B.

FIG. 8 is an exploded perspective view illustrating an producing work for further coupling other portions (portions constituting the lower side portion of the keyboard apparatus 1) with the upper side portion 150 to configure the keyboard apparatus 1, and showing the assembly structure of the keyboard apparatus 1. In the same manner as FIG. 12 which has been described in the paragraph of Related Art, FIG. 8 is drawn upside down with respect to the use state of the keyboard apparatus, and, in the upper side portion 150, the surface of the top cover 100 which is an element constituting the upper side portion 150 is drawn in the lower side. The key movable mechanism portions 250 are inserted into the zones surrounded by the partitioning portion 101 of the top cover 100 in the upper side portion 150. Thereafter, the sheet switch 300 having electrical contacts serving as membrane switches which perform on/off operations in accordance with the existence/nonexistence of depression is placed on the upper side portion 150. The back plate 400 such as a metal-made plate serving a reinforcing member is placed on the sheet switch 300. The sheet switch 300 and the back plate 400 are basically identical with those of the prior art which have been described with reference to FIG. 12.

In the upper side portion 150, the plurality of second coupling pins 620 serving as a second coupling section are disposed so as to project to the lower side (in the figure, the upper side) of the keyboard apparatus. In FIG. 2A, only the pins of the one split frame member 601 are shown. Also in the other split frame members 602, 603 and 604, the plurality of second coupling pins 620 may be similarly disposed. In FIG. 8, the second coupling pins 620 which are four in total, and which are disposed in the vicinities of both edges that are projected outward from the split frame members 601 and 604 placed on both lateral sides are shown as a typical example. Hereinafter, the second coupling pins 620 will be described.

In the sheet switch 300, the holes 310 which are slightly larger than the second coupling pins 620 so as to allow the second coupling pins 620 to pass therethrough are disposed in the vicinities of the four edges, and, also in the back plate 400, the holes 410 are disposed in the vicinities of the four edges so as to correspond to the positions of the second coupling pins 620. In an assembling process, the second coupling pins 620 are passed through the holes 310 and 410. The tip end portion of the second coupling pins 620 made of a resin are heated so as to be melted, and then collapsed to be welded to the back plate 400, whereby the upper side portion 150 and the back plate 400 are coupled with each other in a form that the sheet switch 300 is interposed therebetween. In this way, the sheet switch 300 and the back plate 400 are coupled with the upper side portion 150. Finally, a bottom cover 500 is coupled to complete the assembly of the keyboard apparatus 1.

Figure 9:
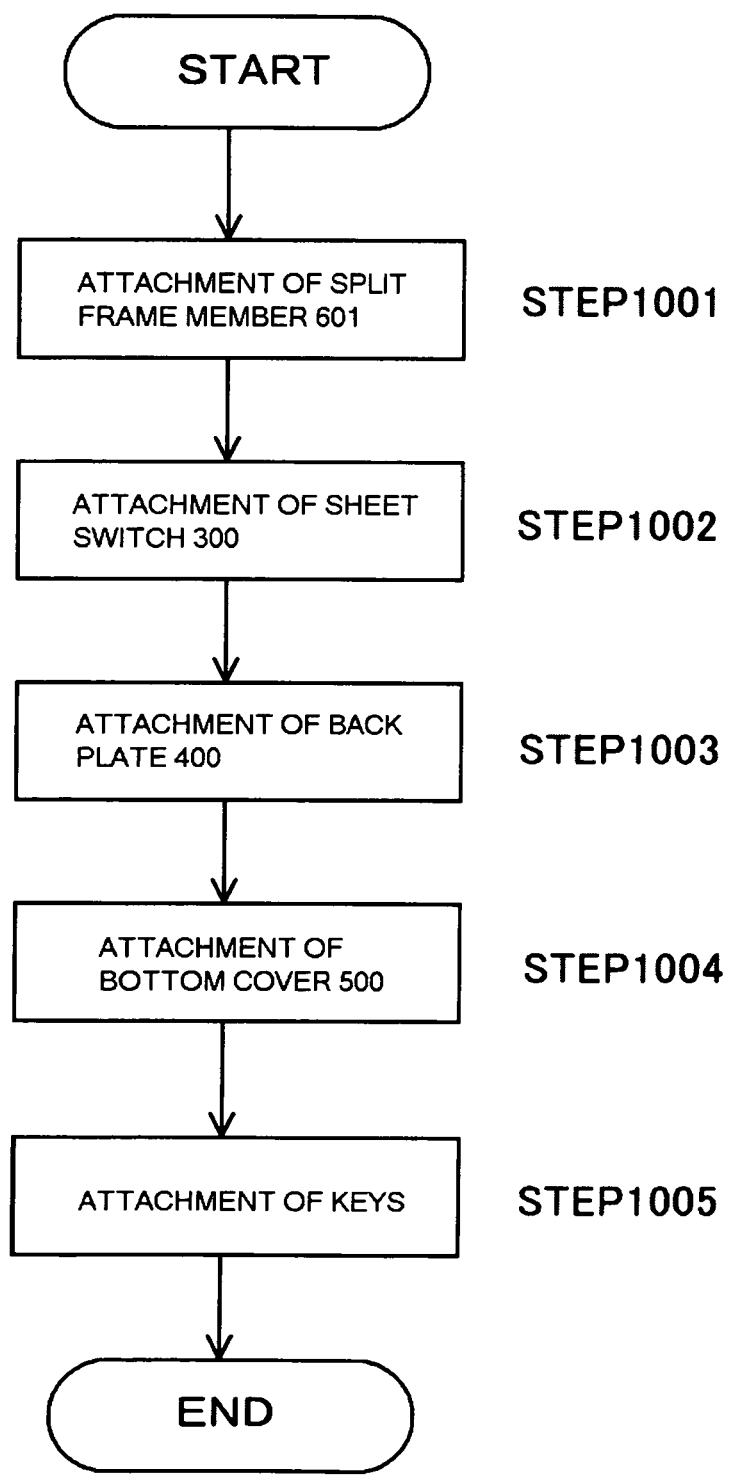
FIG. 9 is a flowchart showing the steps of producing the keyboard apparatus of the present invention.

Hereinafter, the steps of producing the keyboard apparatus 1 will be described in detail with reference to FIGS. 9 and 10A to 10E. FIG. 9 is a flowchart showing the steps of producing the keyboard apparatus 1 according to the embodiment. FIGS. 10A to 10E are sectional views illustrating the steps.

In addition, the first coupling pins and the holes are shown only in the split frame member 601. The coupling pins and the holes of the other split frame members 602, 603 and 604 are configured basically in the same manner, and hence are not shown.

(1) STEP 1001, Attachment of the Split Frame Member 601

Figure 10A:
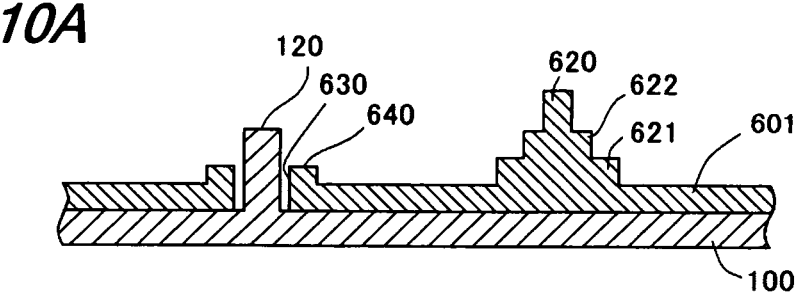
FIGS. 10A to 10E are sectional views illustrating the steps of producing the keyboard apparatus of the present invention.
Figure 10B:
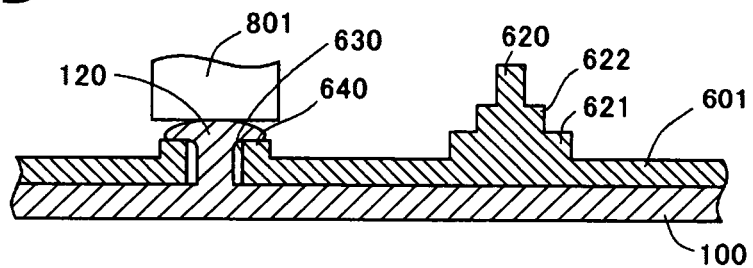

The top cover 100 is reversed, the split frame member 601 is placed thereon, and the first coupling pins 120 of the top cover 100 are passed through the holes 630 of the split frame member 601 (see FIG. 10A). Therefore, the split frame member 601 is positioned with respect to the top cover 100.

The first coupling pins 120 which are projected from the holes 630 of the split frame member 601 are pressed at their tip end portions by a hot plate 801 (see FIG. 10B), to be thermally welded to the projections 640 in the peripheries of the holes 630 of the split frame member 601. Preferably, the temperature of the thermal welding is, for example, about 150° C. As a result, the split frame member 601 is positioned and fixed to the top cover 100.

(2) STEP 1002, Attachment of the Sheet Switch 300

Figure 10C:
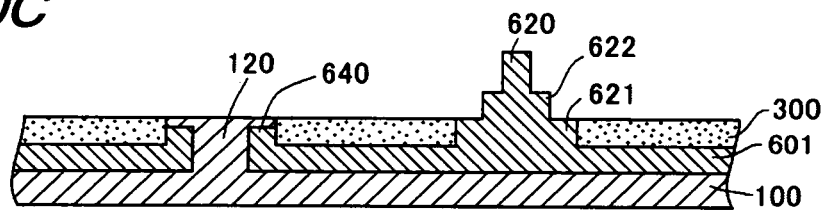

After the split frame member 601 is attached to the top cover 100, the sheet switch 300 is placed on the rear face side of the split frame member 601 (see FIG. 10C). In this case, positioning holes 320 of the sheet switch 300 are engaged with the projection 621 of the top cover 100, whereby the sheet switch 300 is positioned with respect to the top cover 100.

(3) STEP 1003, Attachment of the Back Plate 400

Figure 10D:
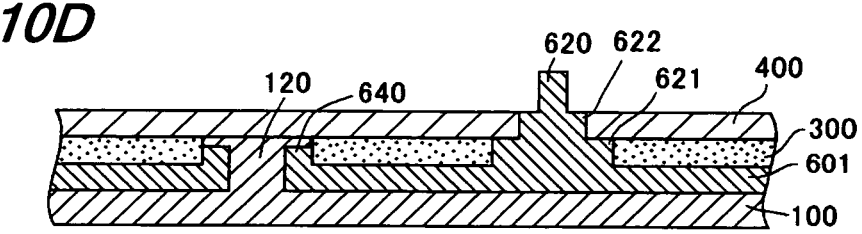
Figure 10E:
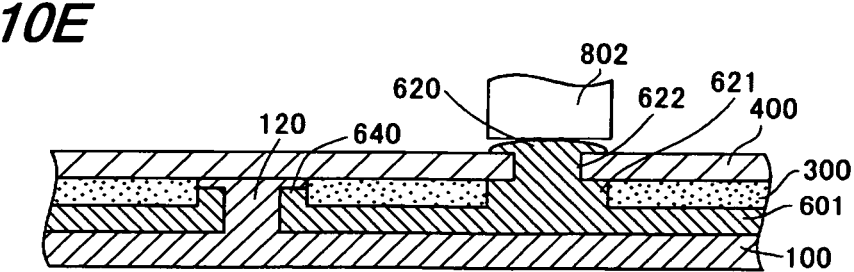
Figure 11:
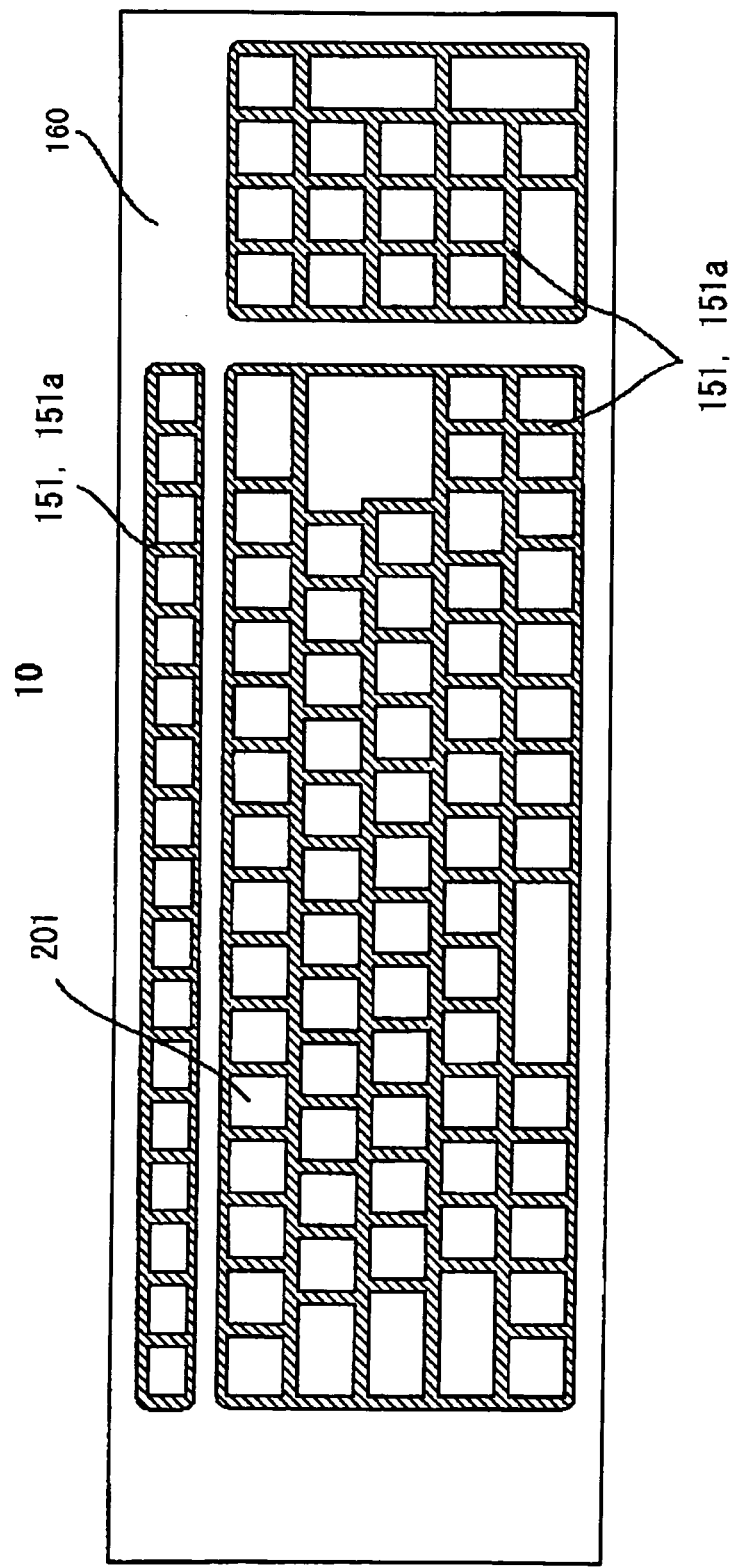
FIG. 11 is a view showing an appearance of a conventional keyboard apparatus.

After the sheet switch 300 is attached to the split frame member 601, the back plate 400 is placed on the rear face side of the sheet switch 300 (see FIG. 10D). In this case, the holes 411 disposed in the back plate 400 are engaged with the slender projections 622 disposed in the split frame member 601, whereby the back plate 400 is positioned with respect to the split frame member 601.

The second coupling pins 620 which are disposed at substantial middles of the slender projections 622 are pressed at their tip end portions by a hot plate 802 (see FIG. 10E), to be thermally welded to the peripheries of the holes 411 of the back plate 400. Preferably, the temperature of the thermal welding is, for example, about 150° C. The back plate 400 may be additionally screwed to the top cover 100. As a result, the back plate 400 is fixed to the top cover 100 and the split frame member 601 in a state where the sheet switch 300 is interposed.

In the above, after the sheet switch 300 is attached to the top cover 100, the back plate 400 is attached. It is a matter of course that, alternatively, the sheet switch 300 may be attached to the back plate 400, and thereafter the integrated member of the sheet switch 300 and the back plate 400 may be attached to the top cover 100.

(4) STEP 1004, Attachment of the Bottom Cover 500

The bottom cover 500 is placed on the rear face side of the back plate 400, and screwed through screwing holes by using screw holes disposed in the top cover 100, whereby the bottom cover 500 is fixed to the top cover 100.

(5) STEP 1005, Attachment of the Keys

The keys are attached to the respective key receiving portions 650 disposed in the top cover 100.

The attachment of the keys may be conducted at any time after the sheet switch 300 is attached.

As a result of the above-described steps, the keyboard apparatus is produced. Although, in the above, the description of mounting of circuit boards and the like is omitted, the circuit boards and the like may be mounted in any adequate step.

The thus configured keyboard apparatus 1 according to the embodiment achieves the following effects.

It may be contemplated that, unlike the embodiment above, the sheet switch 300 is attached to the back plate 400, the split frame member 601 is attached thereon, and then the back plate 400 is attached to the top cover 100. In this case, the positional misfit between the split frame member 601 and the top cover 100 is increased. Therefore, the positional misfit between the holes of the top cover 100 corresponding to the keys and the holes of the split frame member 601 becomes large, so that, in order to attach the keys, it is required to enlarge the gaps between the holes for the keys (the outer edge of the partitioning portion 101) and the key tops 201. However, dust or liquid droplets easily enter through the gaps to cause a fault. Moreover, such gaps impair the appearance.

By contrast, in the embodiment, the split frame member 601 is directly attached to the top cover 100 in the initial stage, and hence the positional misfit between the split frame member 601 and the top cover 100 is reduced. Therefore, the positional misfit between the holes of the top cover 100 corresponding to the keys and those of the split frame member 601 becomes small, so that the gaps between the holes for the keys (the outer edge of the partitioning portion 101) and the key tops 201 can be made small. As a result, entering of dust or liquid droplets through the gaps is remarkably reduced, and the appearance is excellent.

In the present embodiment described above, the first coupling pins 120 and second coupling pins 620 are set as the first and second coupling section, and the pins are welded to the corresponding member after the pins are inserted into the holes 630, 310 and 410, whereby the relating members are coupled with one another. The coupling sections are not restricted to them. Alternatively, the coupling section may be realized by other section such as screwing, bonding by an adhesive agent, or hooking by a hook.

The T-like pins 121 and T-like holes 631 which are used for positioning the split frame members 601, 602, 603 and 604 and the top cover 100 are not restricted to the above-described shape, and may have any of various shapes. For example, a combination of L-like pins and L-like holes, or a combination of square pins and square holes may be employed. In this case, the positions of the positioning section are not restricted to the vicinity of the middle of each of the split frame members 601, 602, 603 and 604. As shown in FIG. 2B, a combination of T-like pins 122 and T-like holes 632 may be adequately disposed in the periphery thereof, so that rotational backlash of each split frame member can be surely prevented from occurring.

Figure 12:
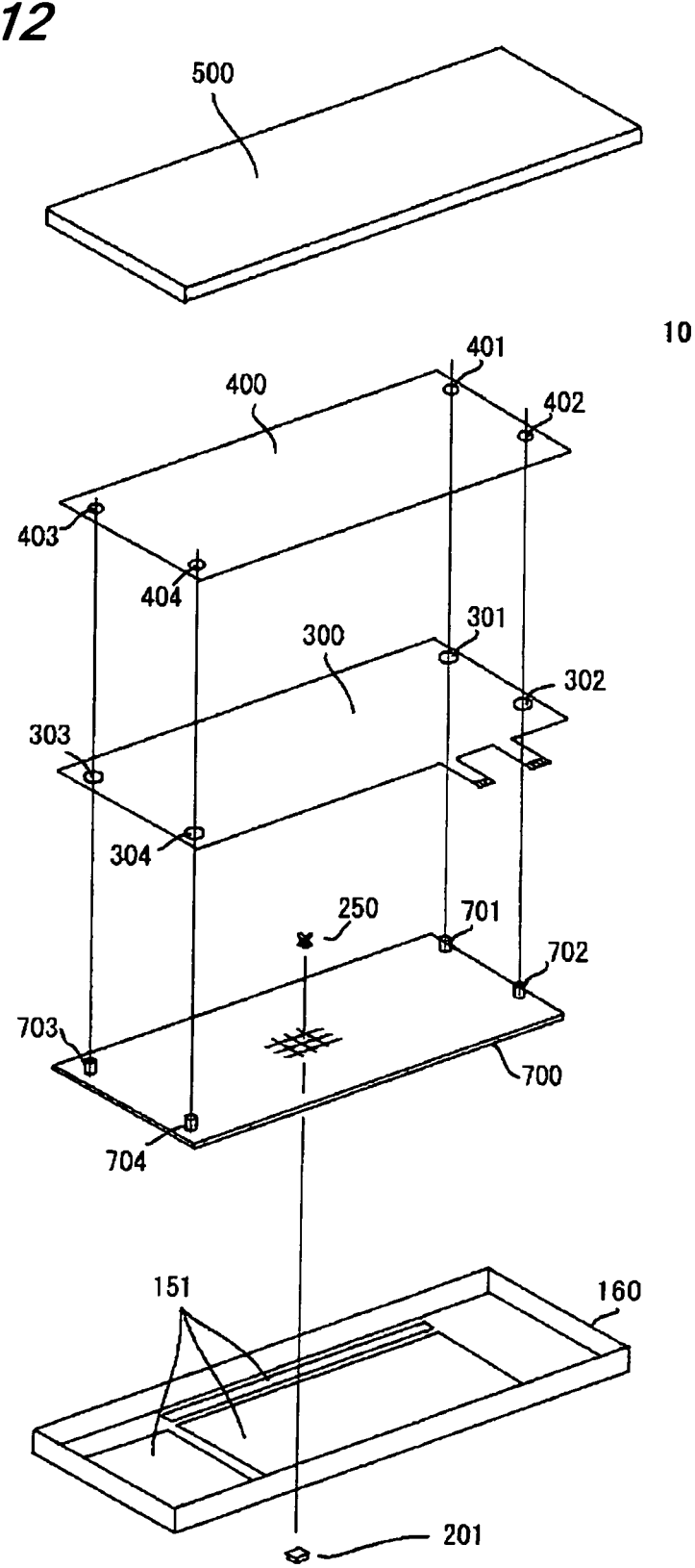
FIG. 12 is an exploded perspective view of the conventional keyboard apparatus.

The configuration in which the frame member is split and directly attached to the top cover as described above enables the gap between the outer edge of the partitioning portion 101 and the key tops 201 to be reduced to about 0.5 mm. In the case where the attachment relationship between the frame member and the top cover is as shown in FIG. 12 and the frame member is not split, a trouble occurred in which the key tops 201 cannot be attached unless the gap between the outer edge of the partitioning portion 101 and the key tops 201 is set to 0.8 mm or more.

Although, in the embodiment described above, a keyboard apparatus for a personal computer has been exemplified, the present invention is not restricted to this. It is a matter of course that the present invention may be modified and implemented within the scope of its technical concept, and also the implementation range belongs to the technical scope of the present invention. For example, the present invention can be applied not only to a stand-alone keyboard apparatus, but also to a keyboard apparatus which is to be mounted on a notebook personal computer or the like. It is a matter of course that the present invention is not restricted to a personal computer, and can be applied to other electronic apparatuses having a key input apparatus, such as a PDA, a game machine, and a portable telephone.

The present invention can be applied to a keyboard apparatus or the like which is used for inputting information to a personal computer or the like.

What is claimed is:

1. A keyboard apparatus comprising:
   a plurality of keys, wherein each key has a key cap;
   a switching section that detects depression of each of the keys;
   a top cover that is integrally formed with a partitioning portion separating adjacent keys from each other;
   a frame member that includes a plurality of key receiving portions which, in a case where the frame member is attached to the top cover, support the key caps of the keys in a manner such that an entire outer perimeter of the key cap of each of the keys is surrounded by the partitioning portion;
   a first coupling section that affixes the top cover to the frame member by welding; and
   a second coupling section that affixes a first surface portion of the keyboard apparatus including the switching section, to a second surface portion of the keyboard apparatus including the top cover and the frame member with which the top cover is coupled by the first coupling section,
   wherein the second coupling section affixes the first surface portion to the second surface portion by welding.

2. The keyboard apparatus as claimed in claim 1, wherein the frame member has a rectangular shape, and includes a plurality of split frame members which are formed by splitting the frame member in a longitudinal direction of the frame member.

3. The keyboard apparatus as claimed in claim 2, wherein the plurality of split frame members are formed by splitting the frame member in a manner such that, in a case where there exist a plurality of key layouts, at least one part of one key layout is identical to at least one part of each of the other key layouts.

4. The keyboard apparatus as claimed in claim 1, wherein the top cover has a coating thereon, and the frame member has no coating thereon.

5. The keyboard apparatus as claimed in claim 1, wherein the first coupling section comprises:
   a plurality of first coupling pins that are provided on the top cover; and
   a plurality of first projections each having a hole at a middle position thereof, and being provided at a position corresponding to each of the first coupling pins on the frame member.

6. The keyboard apparatus as claimed in claim 1, wherein the second coupling section comprises:
   a plurality of second projections each having a circular shape, and being provided on the frame member;
   a third projection that has a slender shape, and that is provided on each of the second projections; and
   a second coupling pin that has a columnar shape, and that is provided on a middle of the third projection.

7. The keyboard apparatus as claimed in claim 1, wherein the first coupling section affixes the top cover to the frame member by thermal welding, and the second coupling section affixes the first surface portion to the second surface portion by thermal welding.

8. The keyboard apparatus according to claim 1,
   wherein the first coupling member includes:
      a first coupling pin integrally formed with the top cover, and
      a hole formed in the frame member and through which the first coupling pin passes,
      wherein the first coupling pin is welded to the frame member from a side of the first surface portion to form an expanding part to affix the top cover to the frame member,
   wherein the second coupling member includes:
      a second coupling pin integrally formed with the frame member, and
      a hole formed in the first surface portion and through which the second coupling pin passes, and
      wherein the second coupling pin is welded to the first surface portion from a side opposite to the top cover to form an expanding part to affix the first surface portion to the second surface portion.

9. An electronic apparatus comprising:
   a key input apparatus including:
      a plurality of keys, wherein each key has a key cap;
      a switching section that detects depression of each of the keys;
      a top cover that is integrally formed with a partitioning portion separating adjacent keys from each other;
      a frame member that includes a plurality of key receiving portions which, in a case where the frame member is attached to the top cover, support the key caps of the keys in a manner such that an entire outer perimeter of the key cap of each of the keys is surrounded by the partitioning portion;
      a first coupling section that affixes the top cover to the frame member by welding; and
      a second coupling section that affixes a first surface portion of the key input apparatus including the switching section, to a second surface portion of the key input apparatus including the top cover and the frame member with which the top cover is coupled by the first coupling section,
      wherein the second coupling section affixes the first surface portion to the second surface portion by welding.

* * * * *